US011755025B2

(12) United States Patent
Chen et al.

(10) Patent No.: US 11,755,025 B2
(45) Date of Patent: Sep. 12, 2023

(54) GUIDING VEHICLES THROUGH VEHICLE MANEUVERS USING MACHINE LEARNING MODELS

(71) Applicant: NVIDIA Corporation, Santa Clara, CA (US)

(72) Inventors: Chenyi Chen, Fremont, CA (US); Artem Provodin, Highlands, NJ (US); Urs Muller, Keyport, NJ (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/153,072

(22) Filed: Jan. 11, 2023

(65) Prior Publication Data

US 2023/0168683 A1 Jun. 1, 2023

Related U.S. Application Data

(63) Continuation of application No. 17/322,365, filed on May 17, 2021, now Pat. No. 11,609,572, which is a
(Continued)

(51) Int. Cl.
*G06N 3/08* (2023.01)
*G05D 1/02* (2020.01)
(Continued)

(52) U.S. Cl.
CPC ........... *G05D 1/0221* (2013.01); *B60W 30/00* (2013.01); *B60W 30/18154* (2013.01);
(Continued)

(58) Field of Classification Search
CPC ............... G05D 1/0221; G05D 1/0088; G05D 2201/0213; G06V 10/82; G06V 10/764;
(Continued)

(56) References Cited

U.S. PATENT DOCUMENTS 7,221,797 B2   5/2007  Koshizen et al.
7,409,295 B2   8/2008  Paradie
(Continued)

FOREIGN PATENT DOCUMENTS

CN   106740457 A   5/2017
CN   106864454 A   6/2017
(Continued)

OTHER PUBLICATIONS

Adaptive Occlusion Sampling of Rectangular Area Lights with Voxel Cone Tracing, U.S. Appl. No. 62/644,806, filed Mar. 19, 2018
**Note: Copy not provided as part of PTO records.
(Continued)

*Primary Examiner* — Mathew Franklin Gordon
(74) *Attorney, Agent, or Firm* — Taylor English Duma L.L.P.

(57) ABSTRACT

In various examples, a trigger signal may be received that is indicative of a vehicle maneuver to be performed by a vehicle. A recommended vehicle trajectory for the vehicle maneuver may be determined in response to the trigger signal being received. To determine the recommended vehicle trajectory, sensor data may be received that represents a field of view of at least one sensor of the vehicle. A value of a control input and the sensor data may then be applied to a machine learning model(s) and the machine learning model(s) may compute output data that includes vehicle control data that represents the recommended vehicle trajectory for the vehicle through at least a portion of the vehicle maneuver. The vehicle control data may then be sent to a control component of the vehicle to cause the vehicle to be controlled according to the vehicle control data.

20 Claims, 13 Drawing Sheets

Related U.S. Application Data continuation of application No. 16/241,005, filed on Jan. 7, 2019, now Pat. No. 11,042,163.

(60) Provisional application No. 62/614,466, filed on Jan. 7, 2018.

(51) Int. Cl.

| | | |
|---|---|---|
| *G05D 1/00* | (2006.01) | |
| *B60W 30/18* | (2012.01) | |
| *G06N 20/00* | (2019.01) | |
| *B62D 15/02* | (2006.01) | |
| *B60W 30/00* | (2006.01) | |
| *G06N 3/045* | (2023.01) | |
| *G06V 10/764* | (2022.01) | |
| *G06V 10/82* | (2022.01) | |
| *G06V 20/56* | (2022.01) | |

(52) U.S. Cl.
CPC .......... *B62D 15/02* (2013.01); *B62D 15/025* (2013.01); *B62D 15/0255* (2013.01); *G05D 1/0088* (2013.01); *G06N 3/045* (2023.01); *G06N 3/08* (2013.01); *G06N 20/00* (2019.01); *G06V 10/764* (2022.01); *G06V 10/82* (2022.01); *G06V 20/588* (2022.01); *B60W 2420/42* (2013.01); *B60W 2420/52* (2013.01); *G05D 2201/0213* (2013.01)

(58) Field of Classification Search
CPC ........ G06V 20/588; G06N 3/045; G06N 3/08; B60W 30/18154; B60W 2420/42; B60W 2420/52; B62D 15/02; B62D 15/025; B62D 15/0255
See application file for complete search history.

(56) References Cited

U.S. PATENT DOCUMENTS

| | | |
|---|---|---|
| 7,565,006 B2 | 7/2009 | Stam et al. |
| 8,204,642 B2 | 6/2012 | Tanaka et al. |
| 9,373,057 B1 | 6/2016 | Erhan et al. |
| 9,701,307 B1 | 7/2017 | Newman et al. |
| 10,007,269 B1 | 6/2018 | Gray |
| 10,053,091 B2 | 8/2018 | Jiang et al. |
| 10,133,274 B2 | 11/2018 | Shashua et al. |
| 10,134,278 B1 | 11/2018 | Konrardy et al. |
| 10,137,896 B2 | 11/2018 | Zhuang et al. |
| 10,139,831 B2 | 11/2018 | Yan |
| 10,157,331 B1 | 12/2018 | Tang et al. |
| 10,289,569 B2 | 5/2019 | Fortino et al. |
| 10,363,960 B2 | 7/2019 | Stefan et al. |
| 10,372,136 B2 | 8/2019 | Yang et al. |
| 10,489,972 B2 | 11/2019 | Atsmon |
| 10,580,158 B1 | 3/2020 | Mousavian et al. |
| 10,625,748 B1 | 4/2020 | Dong et al. |
| 10,635,110 B2 | 4/2020 | Shashua et al. |
| 10,730,517 B2 | 8/2020 | Park et al. |
| 10,739,778 B2 | 8/2020 | Winkler et al. |
| 10,740,954 B2 | 8/2020 | Liu |
| 10,776,985 B2 | 9/2020 | Liu et al. |
| 10,816,978 B1 | 10/2020 | Schwalb et al. |
| 10,829,793 B2 | 11/2020 | Arikawa et al. |
| 10,885,698 B2 | 1/2021 | Muthler et al. |
| 10,942,030 B2 | 3/2021 | Haque et al. |
| 10,997,433 B2 | 5/2021 | Xu et al. |
| 11,080,590 B2 | 8/2021 | Smolyanskiy et al. |
| 2004/0252864 A1 | 12/2004 | Chang et al. |
| 2007/0021912 A1 | 1/2007 | Morita et al. |
| 2007/0182528 A1 | 8/2007 | Breed et al. |
| 2009/0256840 A1 | 10/2009 | Varadhan et al. |
| 2015/0346716 A1 | 12/2015 | Scharfe et al. |
| 2016/0247290 A1 | 8/2016 | Liu et al. |
| 2016/0321074 A1 | 11/2016 | Hung et al. |
| 2017/0010108 A1 | 1/2017 | Shashua |
| 2017/0090478 A1 | 3/2017 | Blayvas et al. |
| 2017/0220876 A1 | 8/2017 | Gao et al. |
| 2017/0236013 A1 | 8/2017 | Clayton et al. |
| 2017/0259801 A1 | 9/2017 | Abou-Nasr et al. |
| 2017/0344808 A1 | 11/2017 | El-Khamy et al. |
| 2017/0364083 A1 | 12/2017 | Yang et al. |
| 2017/0371340 A1 | 12/2017 | Cohen et al. |
| 2018/0089833 A1 | 3/2018 | Lewis et al. |
| 2018/0173240 A1 | 6/2018 | Fang et al. |
| 2018/0188059 A1 | 7/2018 | Wheeler et al. |
| 2018/0232663 A1 | 8/2018 | Ross et al. |
| 2018/0239361 A1 | 8/2018 | Micks et al. |
| 2018/0251153 A1 | 9/2018 | Li et al. |
| 2018/0275657 A1 | 9/2018 | You |
| 2018/0276278 A1 | 9/2018 | Cagan et al. |
| 2018/0342157 A1 | 11/2018 | Donnelly et al. |
| 2018/0349746 A1 | 12/2018 | Vellespi-Gonzalez |
| 2018/0365740 A1 | 12/2018 | Nix et al. |
| 2018/0370540 A1 | 12/2018 | Yousuf et al. |
| 2018/0373980 A1 | 12/2018 | Huval |
| 2019/0016285 A1 | 1/2019 | Freienstein et al. |
| 2019/0065933 A1 | 2/2019 | Bogdoll et al. |
| 2019/0066328 A1 | 2/2019 | Kwant et al. |
| 2019/0071101 A1 | 3/2019 | Emura et al. |
| 2019/0102646 A1 | 4/2019 | Redmon et al. |
| 2019/0102668 A1 | 4/2019 | Yao et al. |
| 2019/0129831 A1 | 5/2019 | Goldberg |
| 2019/0147600 A1 | 5/2019 | Karasev et al. |
| 2019/0147610 A1 | 5/2019 | Frossard et al. |
| 2019/0171912 A1 | 6/2019 | Vellespi-Gonzalez et al. |
| 2019/0179979 A1 | 6/2019 | Melick |
| 2019/0213481 A1 | 7/2019 | Godard et al. |
| 2019/0235515 A1 | 8/2019 | Shirvani et al. |
| 2019/0250622 A1 | 8/2019 | Nister et al. |
| 2019/0251442 A1 | 8/2019 | Koivisto et al. |
| 2019/0258251 A1 | 8/2019 | Ditty et al. |
| 2019/0258878 A1 | 8/2019 | Koivisto et al. |
| 2019/0286153 A1 | 9/2019 | Rankawat et al. |
| 2019/0302761 A1 | 10/2019 | Huang et al. |
| 2019/0310650 A1 | 10/2019 | Halder |
| 2019/0382007 A1 | 12/2019 | Casas et al. |
| 2020/0013176 A1 | 1/2020 | Kang et al. |
| 2020/0143205 A1 | 5/2020 | Yao et al. |

FOREIGN PATENT DOCUMENTS

| | | |
|---|---|---|
| DE | 102015221920 A1 | 5/2017 |
| DE | 102015226762 A1 | 6/2017 |
| EP | 1930863 A2 | 6/2008 |
| EP | 2384009 A2 | 11/2011 |
| GB | 2547082 A | 8/2017 |
| KR | 20120009590 A | 2/2012 |
| WO | 2012011713 A2 | 1/2012 |
| WO | 2016183074 A1 | 11/2016 |
| WO | 2018002910 A1 | 1/2018 |
| WO | 2018102717 A1 | 6/2018 |
| WO | 2018142394 A2 | 8/2018 |
| WO | 2018147874 A1 | 8/2018 |
| WO | 2018218155 A1 | 11/2018 |

OTHER PUBLICATIONS

Ching Y. Hung et al. "Programmable Vision Accelerator", U.S. Appl. No. 62/156,167, filed May 1, 2015 **Note: Copy not provided as part of PTO records.
"Video Prediction Using Spatially Displaced Convolution'", U.S. Appl. No. 62/647,545, filedin Mar. 23, 2018." **Note: Copy not provided as part of PTO records.
Chen, Chenyi; Final Office Action dated Feb. 8, 2022 in U.S. Appl. No. 16/366,875, 20 pgs.
Nister, David; Corrected Notice of Allowability for U.S. Appl. No. 16/265,780, filed Feb. 1, 2019, dated Jun. 8, 2021, 2 pgs.
Muller, Urs; Restriction Requirement for U.S. Appl. No. 16/409,056, filed May 10, 2019, dated Aug. 12, 2021, 6 pgs.
Bojarski, Mariusz; "End to End Learning for Self-Driving Cars", https://arxiv.org/abs/1604.07316; Apr. 25, 2016, 9 pgs.

(56) References Cited

OTHER PUBLICATIONS

Chen, Chenyi; Second Office Action for Chinese Patent Application No. 201980000745.9, filed May 29, 2019, dated Sep. 9, 2022, 3 pgs. **Note: English Abstract Included.
Chen, Chenyi; Notice of Allowance for U.S. Appl. No. 17/322,365, filed May 17, 2021, dated Nov. 1, 2022. 32 pgs.
Andrew Tao et al: "Detectnet: Deep neural network for object detection in digits", NVIDIA Developer Blog, Aug. 11, 2015 (Aug. 11, 2016), OP055586923, Retrieved from the Internet:URL: https://devblogs.nvidia.com/detectnet-deep-neural-network-object-detection-digits/ [retrieved on May 8, 2019].
Rothe, Rasmus; Gulliaumin, Matthieu; Van Gool, Luc: "Non-maximum Suppression for Object Detection by Passing Messages Between Windows"; "1" In: D. Cremers et al (Eds.): "Computer Vision—ACCV 2014", 2015, Springer International Publishing, Cham, Switzerland, WP0473211944, ISBN: 978-3-319-16865-4, vol. LNCS900, pp. 290-306, DOI:10.1007/978-3-319-16865-4-19.
Bach Martin et al: "Multi-camera traffic light recognition using a classifying Labeled Multi-Bernoulli filter", 2017 IEEE Intelligent Vehicles Symposium (IV), IEEE, Jun. 11, 2017 (Jun. 11, 2017), pp. 1045-1051, XP033133881, DOI: 10.1109/IVS.2017.7995852.
"Taxonomy and Definitions for Terms Related to Driving Automation Systems for on-Road Motor Vehicles", Society of Automotive Engineers (SAE), Standard No. J3016-201609, pp. 30 (Sep. 30, 2016).
"Taxonomy and Definitions for Terms Related to Driving Automation Systems for on-Road Motor Vehicles", Society of Automotive Engineers (SAE), Standard No. J3016-201806, pp. 35 (Jun. 15, 2018).
Aude, E. P. L., et al., "Integration of intelligent systems and sensor fusion within the CONTROLAB AGV", In Mobile Robots XIV, vol. 3838, pp. 50-62 (1999).
Dynov, I., "Is Deep Learning Really the Solution for Everything in Self-Driving Cars? ", Retrieved from Internet URL : https://www.automotive-iq.com/autonomous-drive/articles/deep-learning-really-solution-everything-self-driving-cars, pp. 7 (2017).
Fazlollahtabar, H., et al., "Delay Optimization in a Multiple AGV System", International Journal of Swarm Intelligence and Evolutionary Computation, pp. 7 (2014).
Garnett, N., et al., "Real-Time Category-Based and General Obstacle Detection for Autonomous Driving", IEEE International Conference on Computer Vision Workshops, pp. 198-205 (2017).
Godard, C., et al., "Unsupervised Monocular Depth Estimation with Left-Right Consistency", IEEE Computer Society Conference on Computer Vision and Pattern Recognition, pp. 270-279 (2017).
Jayaraman, A., et al., "Creating 3D Virtual Driving Environments for Simulation-Aided Development of Autonomous Driving and Active Safety", SAE Technical Paper, pp. 1-6 (2017).
Keighobadi, J., et al., "Self-Constructing Neural Network Modeling and Control of an AGV", Positioning, pp. 160-168 (2013).
Kendall, A., et al., "End-to-end Learning of Geometry and Context for Deep Stereo Regression", Cornell University Library, pp. 66-75 (2017).
Liu, H., et al., "Neural Person Search Machines", IEEE International Conference on Computer Vision (ICCV), pp. 493-501 (2017).
Muller, U., et al., "Off-Road Obstacle Avoidance Through End-to-End Learning". In Advances in neural information processing systems, pp. 1-8, (2006).
Neven, D., et al., "Towards end-to-end lane detection: an instance segmentation approach", In 2018 IEEE intelligent vehicles symposium (IV), pp. 7 (2018).
Pang, J., et al., "Cascade Residual Learning: A Two-Stage Convolutional Neural Network for Stereo Matching", IEEE International Conference on Computer Vision Workshops, pp. 887-895 (2017).
Pomerleau, D. A., "Alvinn: An Autonomous Land Vehicle in a Neural Network", In Advances in neural information processing systems, pp. 1-16, (1989).
Rothe, R., et al., "Non-maximum Suppression for Object Detection by Passing Messages Between Windows", ETH Library, pp. 1-17 (2015).
Schwarting, W., et al., "Planning and Decision-Making for Autonomous Vehicles", Annual Review of Control, Robotics, and Autonomous Systems, vol. 1, pp. 187-210, (2018).
Soylu, M., et al., "A self-organizing neural network approach for the single AGV routing problem", European Journal of Operational Research, pp. 124-137 (2000).
Final Office Action dated Apr. 11, 2022 in U.S. Appl. No. 16/409,056, 16 pages.
Weber, M., et al., "DeepTLR: A single deep convolutional network for detection and classification of traffic lights", IEEE Intelligent Vehicles Symposium (IV), pp. 8 (Jun. 2016).
Zhong, Y., et al., "Self-Supervised Learning for Stereo Matching with Self-Improving Ability", Cornell University Library, pp. 1-13 (2017).
Zitzewitz, G. V., "Survey of neural networks in autonomous driving", Survey of Neural Networks in Autonomous Driving, pp. 1-8 (2017).
"Conservative Control for Zone Driving of Autonomous Vehicles Using Safe Time of Arrival", U.S. Appl. No. 62/628,831, filed Feb. 9, 2018. **Note: Copy not provided as part of PTO records.
"Convolutional Neural Networks to Detect Drivable Freespace for Autonomous Vehicles", U.S. Appl. No. 32/643,665, filed Mar. 15, 2018. **Note: Copy not provided as part of PTO records.
"Deep Learning for Path Detection in Autonomous Vehicles", U.S. Appl. No. 62/684,328, filed Jun. 13, 2018 **Note: Copy not provided as part of PTO records.
"Deep Neural Network for Estimating Depth from Stereo Using Semi-Supervised Learning", U.S. Appl. No. 62/646,148, filed Mar. 21, 2018. **Note: Copy not provided as part of PTO records.
"Distance Based Ambient Occlusion Filter for Denoising Ambient Occlusions", U.S. Appl. No. 62/644,601, filed Mar. 19, 2018 **Note: Copy not provided as part of PTO records.
"Energy Based Reflection Filter for Denoising Ray-Traced Glossy Reflections", U.S. Appl. No. 32/644,386, filed Mar. 17, 2018 **Note: Copy not provided as part of PTO records.
"Geometric Shadow Filter for Denoising Ray-Traced Shadows", U.S. Appl. No. 62/644,385, filed Mar. 17, 2018. **Note: Copy not provided as part of PTO records.
"Method and System of Remote Operation of a Vehicle Using an Immersive Virtual Reality Environment", U.S. Appl. No. 62/648,493, filed Mar. 27, 2018 **Note: Copy not provided as part of PTO records.
"Methodology of Using a Single Controller (ECU) for a Fault-Tolerant/Fail-Operational Self-Driving System", U.S. Appl. No. 62/524,283, filed Jun. 23, 2017. **Note: Copy not provided as part of PTO records.
"Methods for accurate real-time object detection and for determining confidence of object detection suitable for D autonomous vehicles", U.S. Appl. No. 62/631,781, filed Feb. 18, 2018. **Note: Copy not provided as part of PTO records.
"Network Injection Rate Limiting", U.S. Appl. No. 62/648,326, filed Mar. 26, 2018 **Note: Copy not provided as part of PTO records.
"Network Synchronization Using Posted Operation Tracking for Flush Semantics", U.S. Appl. No. 62/648,333, filed Mar. 26, 2018. **Note: Copy not provided as part of PTO records.
"Pruning Convolutional Neural Networks for Autonomous Vehicles and Robotics", U.S. Appl. No. 32/630,445, filed Feb. 14, 2018 **Note: Copy not provided as part of PTO records.
"System and Method for Autonomous Shuttles, Robo-Taxis, Ride-Sharing and on-Demand Vehicles", U.S. Appl. No. 62/635,503, filed Feb. 26, 2018. **Note: Copy not provided as part of PTO records.
"System and Method for Safe Operation of Autonomous Vehicles", U.S. Appl. No. 62/625,351, filed Feb. 2, 2018. **Note: Copy not provided as part of PTO records.
"System and Method for Sharing Camera Data Between Primary and Backup Controllers in Autonomous Vehicle Systems", U.S. Appl. No. 62/629,822, filed Feb. 13, 2018 **Note: Copy not provided as part of PTO records.
"System and Method for Training, Testing, Verifying, and Validating Autonomous and Semi-Autonomous Vehicles", U.S. Appl. No. 62/648,399, filed Mar. 27, 2018 **Note: Copy not provided as part of PTO records.

(56) References Cited

OTHER PUBLICATIONS

"System and Methods for Advanced AI-Assisted Vehicles", U.S. Appl. No. 62/648,358, filed Mar. 26, 2018. **Note: Copy not provided as part of PTO records.

"System and Methods for Virtualized Intrusion Detection and Prevent System in Autonomous Vehicles", U.S. Appl. No. 62/682,803, filed Jun. 8, 2018 **Note: Copy not provided as part of PTO records.

"Systems and Methods for Safe and Reliable Autonomous Vehicles", U.S. Appl. No. 62/584,549, filed Nov. 10, 2017. **Note: Copy not provided as part of PTO records.

"Video Prediction Using Spatially Displaced Convolution", U.S. Appl. No. 62/646,309, filed Mar. 21, 2018. **Note: Copy not provided as part of PTO records.

"System and method for controlling autonomous vehicles", U.S. Appl. No. 62/614,466, filed Jan. 1, 2018 **Note: Copy not provided as part of PTO records.

GUIDING VEHICLES THROUGH VEHICLE MANEUVERS USING MACHINE LEARNING MODELS

CROSS-REFERENCE TO RELATED APPLICATIONS

This application is a continuation of U.S. patent application Ser. No. 17/322,365, filed May 17, 2021, which is a continuation of U.S. patent application Ser. No. 16/241,005, filed Jan. 7, 2019, which claims the benefit of U.S. Provisional Application No. 62/614,466, filed on Jan. 7, 2018. Each of these applications is incorporated herein by reference in its entirety.

BACKGROUND

For autonomous vehicles to operate correctly in all environments, the autonomous vehicles must be capable of safely performing vehicle maneuvers, such as lane changes, lane splits, and turns. For example, for an autonomous vehicle to navigate through surface streets (e.g., city streets, side streets, neighborhood streets, etc.) and on highways (e.g., multi-lane roads), the autonomous vehicle is required to make turns, take lane splits, change lanes, and/or perform other vehicle maneuvers.

Conventional approaches to performing such vehicle maneuvers require a high definition (HD) map that not only relies on accurate, pre-recorded mapping of roads, lanes of roads, and intersections within the roads to global coordinates, but also relies on mapping the locations for a multitude of static objects—such as street signs, traffic signals, lane markings, and the like—to global coordinates in order to perform effectively. In such approaches, the autonomous vehicle localizes itself with respect to the HD map and performs vehicle maneuvers by referencing the location of the autonomous vehicle with respect to the HD map (e.g., by comparing global coordinates of the autonomous vehicle to the global coordinates of the HD map).

These conventional approaches present several challenges and obstacles that not only make them less reliable, but also less capable of universal implementation. For example, when the HD map is not updated or known for a given location (e.g., a certain neighborhood, town, city, etc.), the autonomous vehicle may be incapable of safely operating in such a location. As a result, the autonomous vehicle is limited to travel within locations that have been accurately mapped, and may not operate safely or fully autonomously when traveling in locations not supported by the HD map. Further, generating, maintaining, updating, and navigating an HD map is computationally expensive, and requires large amounts of processing power, energy, and bandwidth to enable safe and effective operation of autonomous vehicles.

SUMMARY

Embodiments of the present disclosure relate to using machine learning models as guidance for vehicles (e.g., autonomous vehicles) in performing vehicle maneuvers. More specifically, systems and methods are disclosed that use machine learning model(s) to provide guidance for vehicles when performing lane changes, lane splits, turns, and/or other vehicle maneuvers.

In contrast to conventional systems, such as those described above, the current system uses a machine learning model(s) that computes vehicle control data representative of a trajectory and/or controls for following the trajectory for an autonomous vehicle when performing a vehicle maneuver. The machine learning model(s) may perform the computations based on one or more of sensor data generated by sensor(s) of the autonomous vehicle (e.g., camera(s), RADAR sensors, LIDAR sensors, etc.), control inputs representative of a type of and progress through a vehicle maneuver (e.g., right turn, left lane change, right lane split, etc.), low-resolution map data (e.g., two-dimensional representations of intersections, basic geometry of the road and/or intersection, etc.), and/or vehicle status data (e.g., a current speed of the autonomous vehicle).

As a result, the autonomous vehicle is able to navigate through lane changes, lane splits, turns, and other vehicle maneuvers by relying primarily on computer vision rather than localization using an HD map (e.g., persistently computing a location of the vehicle with respect to static objects, lanes, intersections, etc. as represented on the HD map). By removing the reliance on an HD map, the autonomous vehicle is able to perform lane changes, lane splits, turns, and/or other vehicle maneuvers in any location, regardless of whether an HD map is available for that location. In addition, by using a machine learning model(s) and sensor data generated by the autonomous vehicle, vehicle maneuvers performed according to the present disclosure may be less computationally expensive than conventional approaches, and require less processing power, energy consumption, and bandwidth.

BRIEF DESCRIPTION OF THE DRAWINGS

The present systems and methods for using machine learning models as guidance for vehicles in performing vehicle maneuvers is described in detail below with reference to the attached drawing figures, wherein.

DETAILED DESCRIPTION

Figure 1A:
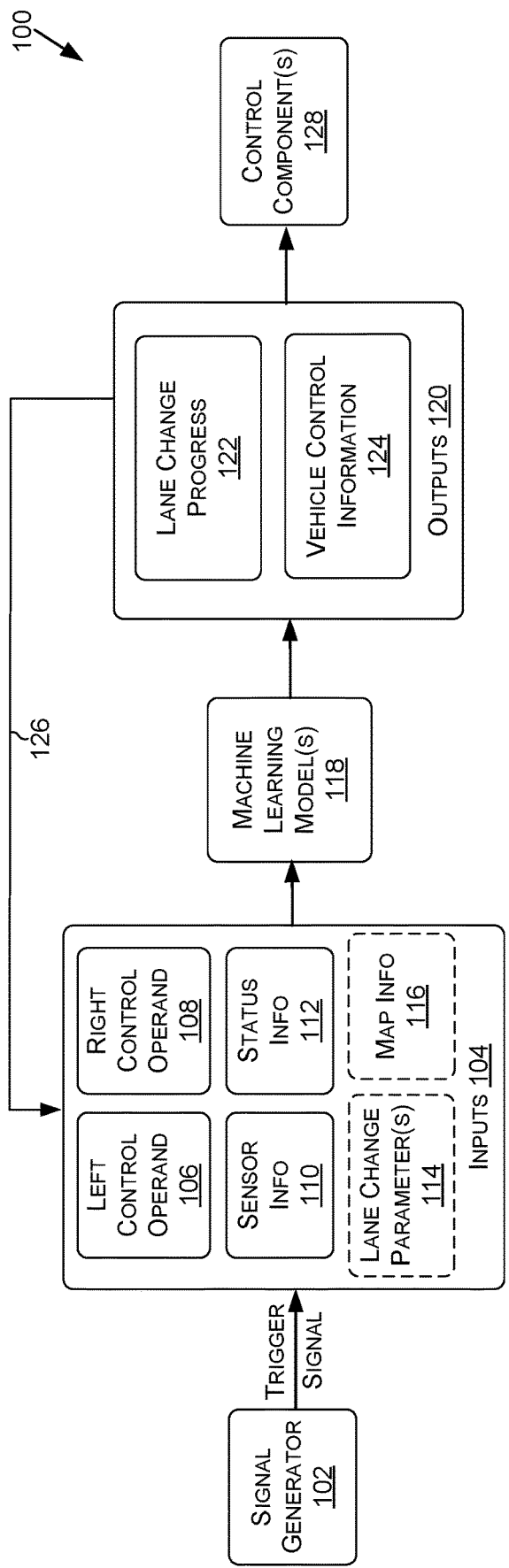
FIG. 1A is a data flow diagram illustrating an example process for performing a vehicle maneuver, in accordance with some embodiments of the present disclosure.

Systems and methods are disclosed related using machine learning models as guidance for vehicles in performing vehicle maneuvers. The present disclosure may be described with respect to an example autonomous vehicle 140 (alternatively referred to herein as "vehicle 140" or "autonomous vehicle 140"), an example of which is described in more detail herein with respect to FIGS. 8A-8D. In addition, although the vehicle maneuvers described herein include primarily lane changes, lane splits, and turns, the present disclosure is not intended to be limited to only these vehicle maneuvers. For example, operations performed for or in the course of parking, reversing, and/or other vehicle maneuvers may also benefit from the methods described herein. In addition, although the description in the present disclosure separates lane changes from lane splits and turns, this is not intended to be limiting. For example, features and functionality described herein with respect to lane changes may also be applicable to lane splits and/or turns. In the alternative, features and functionality described herein with respect to lane splits and/or turns may also be applicable to lane changes.

Lane Changes

As described above, conventional systems rely on an HD map for performing lane changes. However, by relying on an HD map, an autonomous vehicle must first have accurate location information (e.g., from a GPS sensor) and must also have an accurate HD map. As a result, when an HD map does not exist and/or when the location information is updating slowly and/or is inaccurate, lane changing may not be performed safely. The autonomous vehicle may then not perform the lane change (e.g., may implement a safety protocol to abort the lane change), perform an erratic lane change (e.g., because the location information is inaccurate, so the localization of the vehicle with respect to the lane markings may suffer as a result), and/or require hand-off of the controls to a human driver. None of these options are particularly desirable for a passenger of the autonomous vehicle.

The present systems provide for an autonomous vehicle 140 that may make lane changes without relying on an HD map and/or location information. Instead, the autonomous vehicle may rely on computer vision using sensor data generated from one or more sensors of the vehicle (e.g., cameras, LIDAR sensors, RADAR sensors, etc.). As a result, the changing of the lanes is perception based, and thus may avoid reliance on potentially unavailable, obsolete, and/or otherwise inaccurate information (e.g., HD maps, location information, etc.).

For example, a trigger signal may be received (e.g., left lane change, right lane change) in response to an input (e.g., a user input to a turn signal or blinker switch, an input from a control system (e.g., in response to a determination made by a planning layer of an autonomous driving software stack), and/or otherwise in response to a command from the system. In response to (or based on) the trigger signal, a left control operand (for changing lanes left) or a right control operand (for changing lanes right) may be updated to an initial value (e.g., 1, 100%, etc.) to indicate the beginning of a lane change procedure or mode. The left control operand and/or right control operand may be an input into a machine learning model(s) (e.g., a neural network, such as a convolutional neural network). In addition, sensor data from one or more sensors of the vehicle (e.g., cameras, LIDAR sensors, RADAR sensors, etc.) may be provided as input to the machine learning model(s).

The machine learning model(s) may output vehicle trajectory points (e.g., (x, y) coordinates) representative of a recommended vehicle trajectory and/or proposed controls for a vehicle control unit for controlling the vehicle according to the recommended vehicle trajectory. During performance of the lane change, the machine learning model(s) may continue to receive the sensor data and may calculate the status of the lane change as represented by progress data (e.g., representative of the progress of the vehicle through the lane change) output by the machine learning model(s). This output, in some examples after going through control logic to determine a control input update based on the progress data, may be fed back to the left control operand or the right control operand (e.g., dependent on the direction of the lane change), and the updated value for the left control operand or the right control operand may be provided to the machine learning model(s) in a next iteration. This process may continue until the lane change is completed.

In some examples, a lane change may be discretized into a series of stages. For example, a lane change may include two stages, three stages, four stages, and/or another number of stages. Some lane changes may include a different number of stages than other lane changes. For example, a first lane change may include two stages, while a second lane change may include three stages, a third lane change may include five stages, and so on. In some examples, a determination may be made (e.g., when the trigger signal is received) of the type of lane change and/or variables or other information in the environment that effect the lane change (e.g., a left lane change, a right lane change, a left lane change on a curve, a right lane change in between two vehicles, etc.). Depending on the determination of the type of lane change and/or the variables or other information in the environment, a determination may be made as to how many stages should be included in the lane change.

For example, in a non-limiting example, for a left lane change, when another object is currently next to the vehicle in the destination lane, a determination may be made that three stages are necessary (e.g., a first stage to accelerate or decelerate such that the object is no longer to the left of the vehicle, a second stage from the end of the first stage until the vehicle is approximately midway between the original lane and the destination lane, and third stage between the end of the second stage and when the vehicle is in the destination lane).

In another non-limiting example, the lane change may include at least two stages—a first stage from a beginning of the lane change to the middle of the lane change (e.g., approximately when the centerline of the vehicle lines up with the lane markings separating the original lane from the destination lane, or when the vehicle is roughly equidistant to the outer lane markings of the original lane and the destination lane) and a second stage from the middle of the lane change until the end (or until a progress threshold that represents an end of the lane change). In such examples, the left control operand or the right control operand may be updated based on progress thresholds representative of a threshold amount of the lane change that the vehicle has progressed through (e.g., for a right lane change, right control operand may be approximately 1.0 throughout the first stage, approximately 0.5 throughout the second stage, and approximately 0.0 after the lane change is completed and/or after a progress threshold representative of the end is reached). The stage change may take place when the lane change progress exceeds the progress thresholds (e.g., between 0%-50% complete, remain in stage one, at 50% complete, enter stage two, at 80% complete, exit lane change procedure or mode, and begin a lane keeping procedure or mode in the destination lane).

By discretizing a lane change into a series of multiple stages, the system may be more able to clearly determine when a lane change begins and ends and may be more able to clearly distinguish between sensor data that may appear similar during different portions of the same lane change. For example, at 48% complete and 52% complete, the sensor data may be relatively similar, so by starting stage two of the lane change at or approximately at 50%, the system may understand that performing the second stage of the lane change focuses on entering and aligning the vehicle with the destination lane (e.g., entering a lane keeping procedure or mode). In addition, by only changing the left control operand or right control operand in response to thresholds being met, the noisy outputs of the machine learning model(s) (e.g., 70% completed, then 68% completed, then 72% completed, etc.) may be filtered such that the resultant vehicle trajectories do not suffer from the noise of the outputs (e.g., do not result in sporadic or erratic vehicle trajectories).

In some examples, lane change parameters (e.g., vehicle maneuver parameters) may also be input into the machine learning model(s), such as a lane change length (e.g., a distance that the vehicle should cover during the lane change), an amount of time for completing the lane change, a velocity or speed of the lane change, and/or other lane change parameters. The lane change parameters may be used by the machine learning model(s) to determine the vehicle trajectory points for generating the recommended vehicle trajectory.

Now referring to FIG. 1A, FIG. 1A is a data flow diagram illustrating an example process 100 for performing a vehicle maneuver, in accordance with some embodiments of the present disclosure. The vehicle maneuver described with respect to FIG. 1A is a lane change, however, as described herein, this is for example purposes only and is not intended to be limiting.

The vehicle maneuver may begin when a trigger signal (e.g., from a signal generator 102) is received. Any number of inputs 104, including but not limited to those illustrated in FIG. 1A, may be input into a machine learning model(s) 118. The machine learning model(s) 118 may generate or compute any number of outputs 120, including but not limited to those illustrated in FIG. 1A. At least one of the outputs 120 may be fed back into the inputs 104, as indicated by feedback loop 126 (e.g., the outputs 120 may be used to update one or more of the inputs 104 for a next iteration of the machine learning model(s) 118. At least one of the outputs 120 may be transmitted or sent to a control component(s) 128 of the autonomous vehicle 140. The control component(s) 128 may then use the output(s) 120 (or information generated from the output(s) 120) to control the vehicle 140 according to the output(s) 120.

The trigger signal from the signal generator 102 may include data representative of the type of vehicle maneuver to be completed by the vehicle 140. For example, the trigger signal may include data representing or otherwise indicative of a right lane change (e.g., change lanes from current lane to adjacent lane(s) to the right of the vehicle 140), a left lane change (e.g., change lanes from current lane to adjacent lane(s) to the left of the vehicle 140), and/or other vehicle maneuver, such as a turn or lane split, as described in more detail below with respect to FIGS. 5A-5C. In some examples, the trigger signal may be generated by the signal generator 102 using pulse width modulation (PWM), or another signal generation method, and may be analyzed by a component(s) of the vehicle 140 to determine the type of vehicle maneuver represented by the trigger signal.

The trigger signal may be received in response to an input received by the vehicle 140 and/or in response to a decision made by the vehicle 140. For example, an operator of the vehicle 140 may provide an input via a turn signal, a keyboard, a human machine interface (HMI) display, voice input, and/or another input type. The input may be representative of a specific vehicle maneuver and, as a result, the trigger signal representing the specific vehicle maneuver may be generated. As another example, the vehicle 140 (e.g., one or more components or features of a planning layer of an autonomous vehicle software stack) may determine that a specific vehicle maneuver is required or desired and, as a result, may generate the trigger signal representing the specific vehicle maneuver. In such an example, the vehicle 140 may use an HD map, navigational guidance, and/or another information source to determine that the specific vehicle maneuver is required or desired (e.g., to increase safety). In some examples, the trigger signal may include or correspond to a guidance signal generated by a GNSS application (e.g., a GPS application).

The inputs 104 may include a left control operand 106, a right control operand 108, sensor information 110, status information 112, a lane change parameter(s) 114, map information 116, and/or other inputs. Values of the left control operand 106 and the right control operand 108 may be determined based on the trigger signal and/or feedback from the outputs 120 of the machine learning model(s) 118. For example, when the trigger signal is representative of a left lane change, the value of the left control operand 106 may be set, updated, and/or changed based on the trigger signal. As another example, when the trigger signal is representative of a right lane change, the value of the right control operand 108 may be set, updated, and/or changed based on the trigger signal. In any example, the machine learning model(s) 118 may use the left control operand 106 and/or the right control operand 108 in computing vehicle control information 124, lane change progress 122, and/or other outputs 120.

In some examples, for a left lane change, in response to receiving the trigger signal, the value of the left control operand 106 may be set, updated, and/or changed to 1, 100%, and/or another value indicating a start of the left lane change. As the lane change progresses, the value of the left control operand 106 may be updated to represent the progress of the vehicle 140 through the lane change. For example, based on one of the outputs 120, such as the lane change progress 122, the value of the left control operand 106 may be set, updated, and/or changed. In some examples, the value of the left control operand 106 may be set, updated, and/or changed incrementally at each iteration of using the machine learning model(s) 118 for the vehicle maneuver, until the left lane change has been completed (e.g., 0.9 or 90% when ten percent of lane change is completed, 0.45 or 45% when fifty-five percent of the lane change is completed, etc.). In other examples, the value of the left control operand 106 may be set, updated, and/or changed in response to certain progress thresholds being met, as described herein at least with respect to FIG. 2 (e.g., the value may be set to 1 when the progress through the lane change is less than fifty percent completed, 0.5 when the progress through the lane change is between fifty percent and a next threshold, 0 when the progress through the lane change is eighty percent or more completed, etc.). In such examples, the progress thresholds may be used to account for potentially noisy outputs 120 of the machine learning model(s) 118.

Similarly, for a right lane change, in response to receiving the trigger signal, the value of the right control operand 108 may be set, updated, and/or changed to 1, 100%, and/or another value indicating a start of the right lane change. As the lane change progresses, the value of the right control operand 108 may be updated to represent the progress of the vehicle 140 through the lane change. For example, based on one of the outputs 120, such as the lane change progress 122, the value of the right control operand 108 may be set, updated, and/or changed. In some examples, the value of the right control operand 108 may be set, updated, and/or changed at each iteration of the machine learning model(s) 118, until the right lane change has been completed. In other examples, the value of the right control operand 108 may be set, updated, and/or changed in response to certain progress thresholds being met, as described herein at least with respect to FIG. 2.

Another input 104 that may be applied to the machine learning model(s) 118 is sensor information 110. The sensor information 110 may include sensor data from any of the sensors of the vehicle 140 (and/or other vehicles, in some examples). For example, with reference to FIGS. 8A-8C, the sensor information 110 may include the sensor data generated by, for example and without limitation, global navigation satellite systems (GNSS) sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 140), vibration sensor(s) 842, steering sensor(s) 840, brake sensor(s) (e.g., as part of the brake sensor system 846), and/or other sensor types.

In some examples, the sensor information 110 may include the sensor data generated by a forward-facing camera, such as a wide-view camera 870, a surround camera 874, a stereo camera 868, and/or a long-range or mid-range camera 898. This sensor data may be useful for computer vision and/or perception when navigating a lane change because a forward-facing camera may include a field of view (e.g., the field of view of the forward-facing stereo camera 868 and/or the wide-view camera 870 of FIG. 8B) that includes both a current lane of travel of the vehicle 140 and adjacent lane(s) of travel of the vehicle 140. In some examples, more than one camera or other sensor may be used to incorporate multiple fields of view (e.g., the fields of view of the long-range cameras 898, the forward-facing stereo camera 868, and/or the forward facing wide-view camera 870 of FIG. 8B).

In any example, the sensor information 110 may include image data representing an image(s), image data representing a video (e.g., snapshots of video), and/or sensor data representing fields of view of sensors (e.g., LIDAR sensor(s) 864, RADAR sensor(s) 860, etc.). The sensor information 110 may be input into the machine learning model(s) 118 and used by the machine learning model(s) 118 to compute the outputs 120, such as the lane change progress 122 and/or the vehicle control information 124.

The inputs 104 may include status information 112. The status information 112 may include data representative of the status of the vehicle 140, such as speed, velocity, acceleration, deceleration, orientation, and/or other status information. This data may be captured by and/or received from one or more of the sensors of the vehicle 140, such as one or more of the IMU sensor(s) 866, speed sensor(s) 844, steering sensor(s) 840, vibration sensor(s) 842, and/or one or more sensors of the brake sensor system 846, propulsion system 850, and/or steering system 854.

The status information 112 may be used by the machine learning model(s) 118 to compute the outputs 120, such as the lane change progress 122 and/or the vehicle control information 124. For example, when the vehicle control information 124 includes a recommended vehicle trajectory, or control data for controlling the vehicle 140 according to a recommended vehicle trajectory, the status information 112 (e.g., speed, orientation, etc.) may be valuable to the machine learning model(s) 118 in performing such computations. In other words, a vehicle trajectory that is representative of recommended future (x, y) coordinates of the vehicle 140 may benefit from knowledge of the current speed, orientation, and/or other status information 112 of the vehicle 140.

In some examples, the inputs 104 may further include the lane change parameter(s) 114 (e.g., vehicle maneuver parameters). The lane change parameter(s) 114 may include a length of a lane change (e.g., a minimum, maximum, and/or range of distance the vehicle 140 may travel, such as in a forward direction, when performing the lane change), a duration of the lane change (e.g., an amount of time within which the lane change should be completed), a speed or velocity of the lane change, a tempo factor (e.g., a measure, such as on a scale of values (e.g., 1-10), that is indicative of the speed and/or tempo of the lane change), and/or another lane change parameter 114.

The lane change parameter(s) 114 may be used by the machine learning model(s) 118 to compute the outputs 120, such as the lane change progress 122 and/or the vehicle control information 124. For example, when computing a recommended vehicle trajectory, the machine learning model(s) 118 may use the lane change parameter(s) 114 because the lane change parameter(s) 114 may indicate where along the recommended vehicle trajectory the lane change should end (e.g., based at least in part on the length of the lane change), how quickly the lane change should be completed (e.g., based at least in part on the duration of the lane change), and/or a combination thereof (e.g., based at least in part on the tempo factor). In addition, the lane change progress 122 may be affected by the lane change parameter(s) 114 (e.g., the lane change progress 122 will increase more quickly for shorter lane changes, shorter durations, etc.).

Further, in some examples, the inputs 104 may include map information 116. The map information 116, as described in more detail herein with respect to FIGS. 5A-5C, may be used by the machine learning model(s) 118 to generate the outputs 120, such as the lane change progress 122 and/or the vehicle control information 124. For example, the map information 116 may include low-resolution map data (e.g., screenshots of a 2D map application with or without guidance). This low-resolution map data may include a basic geometry of the road and/or intersections, such as without additional information such as lane markings, number of lanes, locations of sidewalks, street lights, stop signs, etc. In other words, in contrast with the map data representing an HD map (e.g., the HD map 822 and/or the HD maps described herein and relied upon by conventional systems), the map information 116 may be less data intense, and used only as an additional data point by the machine learning model(s) 118 when computing the outputs 120.

Figure 5A:
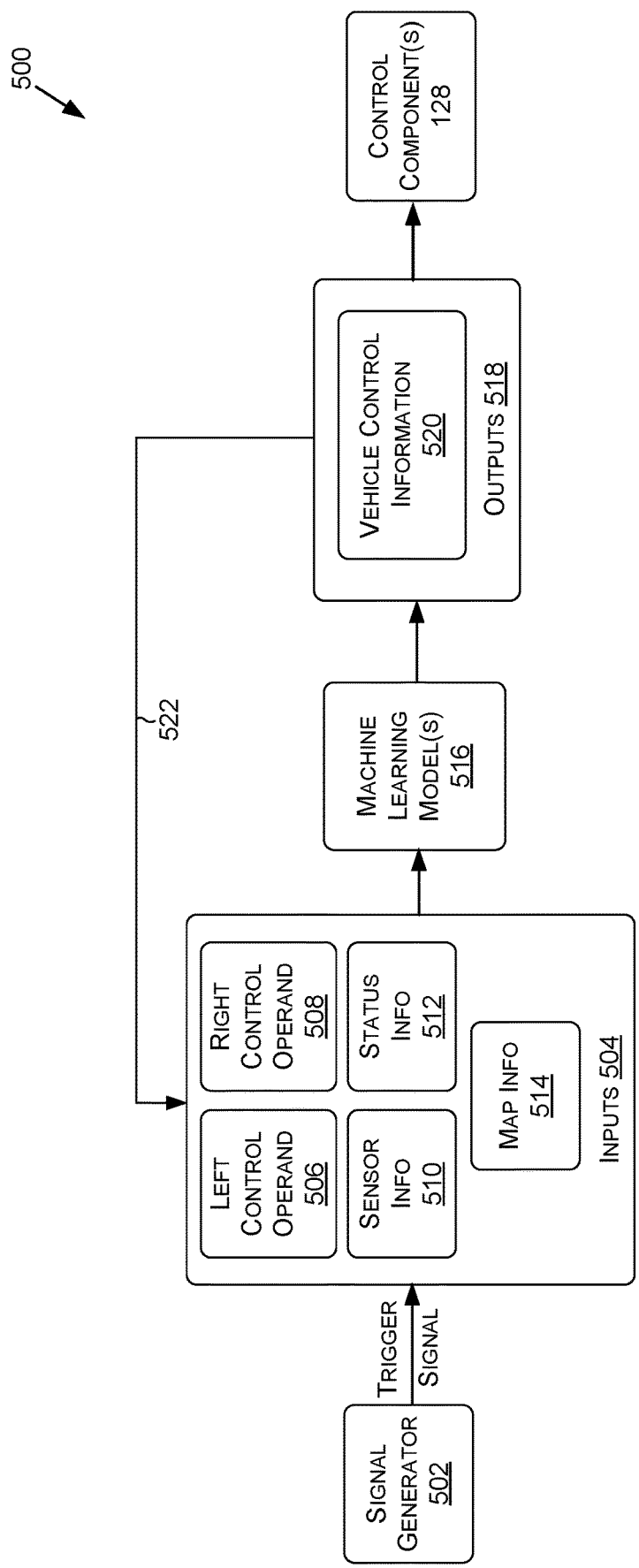
FIG. 5A is a data flow diagram illustrating an example process for performing a vehicle maneuver, in accordance with some embodiments of the present disclosure.
Figure 5B:
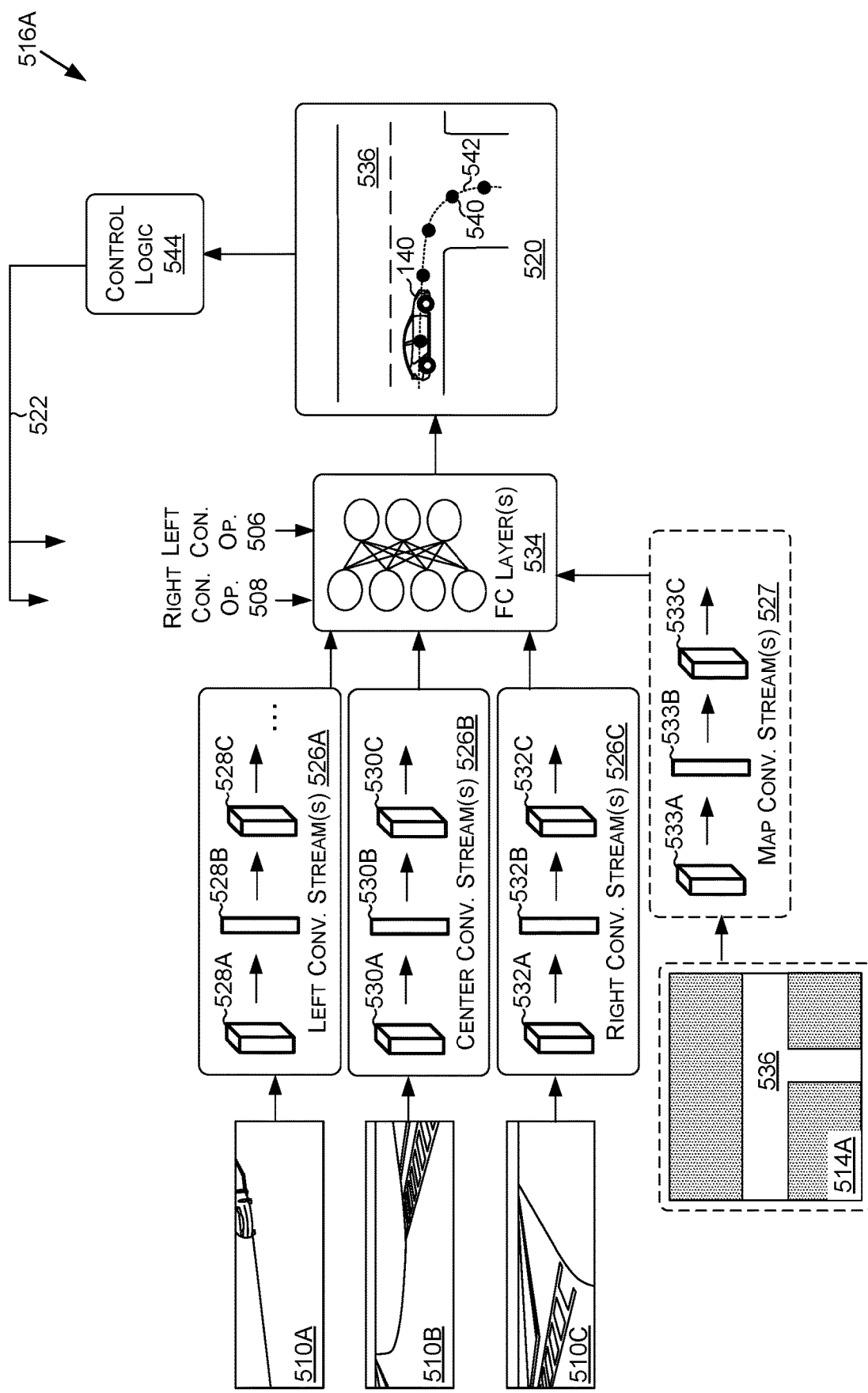
FIG. 5B is an illustration of another example machine learning model(s), in accordance with some embodiments of the present disclosure.

The map information 116, in some examples, may include a screenshot or an image (or data representative thereof) that depicts a current lane of the vehicle 140, a destination lane of the vehicle 140, the vehicle 140 itself, and/or a representation of the path for the vehicle 140 to take through the lane change (e.g., similar to path 546 of FIG. 5B). In some examples, the map information 116 may be similar to that of the map information 514A of FIG. 5B and/or the map information 514B of FIG. 5C, except rather than illustrating an intersection 536 and/or the path 546 through the intersection, the map information 116 may include data indicative of a first lane, a second lane, and/or a path for navigating between them.

In examples where the map information 116 is one of the inputs 104, and the map information 116 includes the path for navigating from one lane to another, the left control operand 106 and/or the right control operand 108 may be used differently or not at all. For example, the left control operand 106 and/or the right control operand 108 may only include a start value (e.g., 1, 100%, etc.) for the start of the lane change and an end value (e.g., 0, 0%, etc.) for the end of the lane change. In other examples, the left control operand 106 and/or the right control operand 108 may not be needed. In either example, the left control operand 106 and/or the right control operand 108 may be different because the vehicle's location with respect to the path may indicate the progress of the vehicle through the lane change, so the machine learning model(s) 118 may not require the left control operand 106 and/or the right control operand 108 when computing the lane change progress 122 (e.g., the vehicle 140 may rely on the path to make this computation instead).

The machine learning model(s) 118 may use the inputs 104 to compute the outputs 120. Although examples are described herein with respect to using neural networks, and specifically convolutional neural networks, as the machine learning model(s) 118 (e.g., with respect to FIGS. 1B and 5B-5C), this is not intended to be limiting. For example, and without limitation, the machine learning model(s) 118 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

The outputs 120 may include lane change progress 122, vehicle control information 124, and/or other output types. The lane change progress 122 may be representative of the progress of the vehicle 140 through the lane change. As described herein, the lane change progress 122 may be fed back to the inputs 104, and specifically may be fed back to the left control operand 106 and/or the right control operand 108 for setting, updating, and/or changing the left control operand 106 and/or right control operand 108. In some examples, the machine learning model(s) 118 may output data representing the lane change progress 122, and logic (e.g., control logic 136 of FIG. 1B) may be used to determine the setting, updating, and/or changing of the left control operand 106 and/or right control operand 108 based on the data.

The outputs 120 may further include the vehicle control information 124. The vehicle control information 124 may include a recommended vehicle trajectory and/or vehicle control data for controlling the vehicle according to the recommended vehicle trajectory. The outputs 120 may include one or more points (e.g., (x, y) coordinates) along the recommended vehicle trajectory and/or may include the recommended vehicle trajectory (e.g., a trajectory extrapolated over each of the points). In some examples, the recommended vehicle trajectory may be represented as a radius of the vehicle maneuver, while in other examples, the recommended vehicle trajectory may be represented as an inverse radius of the vehicle maneuver. The inverse radius may be used in some examples to prevent the recommended vehicle trajectory (or a point thereof) from being computed as an infinite value (e.g., reaching singularity).

In examples where the vehicle control information 124 includes the recommended vehicle trajectory, the recommended vehicle trajectory (or data representative thereof) may be sent or transmitted to the control component(s) 128 of the vehicle 140 (e.g., to a control layer of the autonomous driving software), and the control component(s) 128 may determine the controls required to control the vehicle 140 according to the recommended vehicle trajectory. For example, the control component(s) 128 may send one or more controls to one or more actuators (e.g., actuators controlled by an actuation layer of the autonomous driving software stack). The actuators may include one or more components or features of the brake sensor system 846, the propulsion system 850, the steering system 854, and/or other systems. The vehicle 140 may then be controlled according to the recommended vehicle trajectory of the vehicle control information 124 output by the machine learning model(s) 118. By only outputting the recommended vehicle trajectory and not the controls themselves, the process 100 allow different vehicle manufacturers to determine their own controls and actuations for controlling the vehicle 140 according to the recommended vehicle trajectory.

In other examples, the vehicle control information 124 may include the controls for controlling the vehicle according to the recommended vehicle trajectory. In such examples, the machine learning model(s) 118 may be implemented at the control layer of the autonomous driving software stack, and the vehicle control information 124 may be used to control the vehicle 140 (e.g., cause actuation of one or more actuators of the vehicle by the actuation layer of the autonomous driving software stack).

Figure 1B:
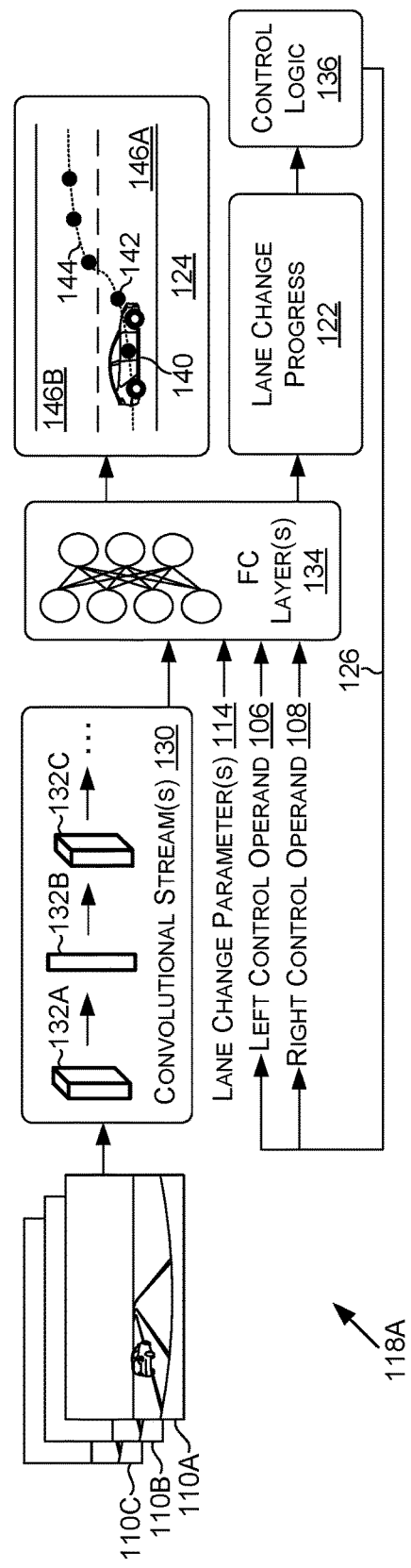
FIG. 1B is an illustration of an example machine learning model(s), in accordance with some embodiments of the present disclosure.

Now referring to FIG. 1B, FIG. 1B is an illustration of an example machine learning model(s) 118A, in accordance with some embodiments of the present disclosure. The machine learning model(s) 118A of FIG. 1B may be one example of a machine learning model(s) 118 that may be used in the process 100. However, the machine learning model(s) 118A of FIG. 1B is not intended to be limiting, and the machine learning model(s) 118 may include additional and/or different machine learning models than the machine learning model(s) 118A of FIG. 1B. The machine learning model(s) 118A may include a convolutional neural network and thus may alternatively be referred to herein as convolutional neural network 118A or convolutional network 118A.

The convolutional network 118A may use inputs 104 that include the left control operand 106, the right control operand 108, the lane change parameter(s) 114, the sensor information 110, and/or other input types. The convolutional network 118A may use sensor information 110A-110C which may include image data generated by one or more cameras (e.g., one or more of the cameras described herein with respect to FIGS. 8A-8C). For example, the sensor information 110A-110C may include image data representative of a field of view of the camera(s). More specifically, the sensor information 110A-110C may include individual images generated by the camera(s), where image data representative of one or more of the individual images is input into the convolutional network 118A at each iteration of the convolutional network 118A.

The sensor information 110 may be input into a convolutional stream 130 of the convolutional network 118A. The convolutional stream 130 may include any number of layers 132, such as the layers 132A-132C. One or more of the layers 132 may include an input layer. The input layer may hold values associated with the sensor information 110. For example, when the sensor information 110 is an image(s), the input layer may hold values representative of the raw pixel values of the image(s) as a volume (e.g., a width, a height, and color channels (e.g., RGB), such as 32×32×3).

One or more layers 132 may include convolutional layers. The convolutional layers may compute the output of neurons that are connected to local regions in an input layer (e.g., the input layer), each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers 132 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 132 may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers 132 may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 130 may include a fully connected layer, while in other examples, the fully connected layer 134 of the convolutional network 118A may be the fully connected layer for the convolutional stream(s) 130.

Although input layers, convolutional layers, pooling layers, ReLU layers, and fully connected layers are discussed herein with respect to the convolutional stream(s) 130, this is not intended to be limiting. For example, additional or alternative layers 132 may be used in the convolutional stream(s) 130, such as normalization layers, SoftMax layers, and/or other layer types.

Different orders and numbers of the layers 132 of the convolutional network 118A may be used depending on the embodiment. For example, for a first vehicle, there may be a first order and number of layers 232, whereas there may be a different order and number of layers 232 for a second vehicle; for a first camera there may be a different order and number of layers 232 than the order and number of layers for a second camera. In other words, the order and number of layers 232 of the convolutional network 118A and/or the convolutional stream 130 is not limited to any one architecture.

In addition, some of the layers 232 may include parameters (e.g., weights), such as the convolutional layers and the fully connected layers, while others may not, such as the ReLU layers and pooling layers. In some examples, the parameters may be learned by the convolutional stream 130 and/or the machine learning model(s) 118A during training. Further, some of the layers 232 may include additional hyper-parameters (e.g., learning rate, stride, epochs, etc.), such as the convolutional layers, the fully connected layers, and the pooling layers, while other layers 232 may not, such as the ReLU layers. The parameters and hyper-parameters are not to be limited and may differ depending on the embodiment.

The output of the convolutional stream(s) 130 may be input to a fully connected layer(s) 134 of the convolutional network 118A. In addition to the output of the convolutional stream(s) 130, the lane change parameter(s), the left control operand 106, the right control operand 108, and/or one or more other inputs 104 may be input to the fully connected layer(s) 134.

The outputs 120 of the convolutional network 118A may include the lane change progress 122, the vehicle control information 124, and/or other output types. The vehicle control information 124, as described herein, may include a recommended vehicle trajectory 144 and/or controls for following the recommended vehicle trajectory 144 (e.g., for controlling the vehicle 140 according to the recommended vehicle trajectory 144, such as steering angle, acceleration, deceleration, etc.). The vehicle control information 124 may include, in some examples, a trajectory point(s) 142 (e.g., as represented by (x, y) coordinates) along the recommended vehicle trajectory 144. In some examples, only a single trajectory point 142 (e.g., the next trajectory point for the vehicle 140 in the sequence of discretized trajectory steps) may be output by the machine learning model(s) 118A. In other examples, more than one trajectory point 142 may be output. As another example, an entire trajectory may be output, which may be extrapolated from two or more trajectory points 142. In any example, the recommended vehicle trajectory 144 may be output as a radius of the recommended vehicle trajectory 144, or may be output as an inverse radius of the recommended vehicle trajectory 144, as described herein. The recommended vehicle trajectory 144 and/or the trajectory point(s) 142 thereon, may be used by the control component(s) 128 to control the vehicle 140 from a first lane 146A to a second lane 146B to execute a lane change (e.g., a left lane change as indicated in FIG. 1B).

With reference to the lane change progress 122, the lane change progress 122 may be output as data representative of the lane change progress 122, and the data may be analyzed to determine the lane change progress 122. In other words, the output of the machine learning model(s) 118 may not be the value of the lane change progress 122, but may be a value that correlates to the lane change progress 122. For example, a lookup table may be used to determine the lane change progress 122 based on the output of the machine learning model(s) 118.

As described herein, the lane change progress 122 may be fed back to the left control operand 106 and/or the right control operand 108 to update the values. In some examples, the control logic 136 may use the lane change progress 122 output by the convolutional network 118A to determine a setting, and update, and/or a change to the left control operand 106 and/or a right control operand 108. In some examples, the left control operand 106 and/or the right control operand 108 may be updated in sync with the lane change progress 122. For example, with respect to a right lane change, when the lane change progress 122 is indicative of the right lane change being a certain percentage complete (e.g., 70%), the control logic 136 may determine that the right control operand 108 should be set, updated, and/or changed to a specific value (e.g., when the lane change progress 122 is 70%, the specific value may be 0.3, indicating that there is 30% left of the right lane change). As such, for each value of the lane change progress 122, there may be a corresponding value to set, update, and/or change the left control operand 106 and/or the right control operand 108 to. In some examples, the left control operand 106 may include positive values (e.g., 0-1, 0%-100%, etc.), and the right control operand 108 may include negative values (e.g., –1-0, –100%-0%, etc.), or vice versa. In such examples, the left control operand 106 and the right control operand 108 may be a single control (e.g., a universal control), and may range from –1 to 1, or –100% to 100%, and/or the like.

In other examples, the left control operand 106 and/or the right control operand 108 may be updated only once certain progress thresholds are met (e.g., thresholds indicative of the progress of the vehicle 140 through the vehicle maneuver, such a lane change). In such examples, the control logic 136 may only update the left control operand 106 and/or the right control operand 108 when the progress thresholds are met. An example of using progress thresholds is illustrated with respect to FIG. 2.

Figure 2:
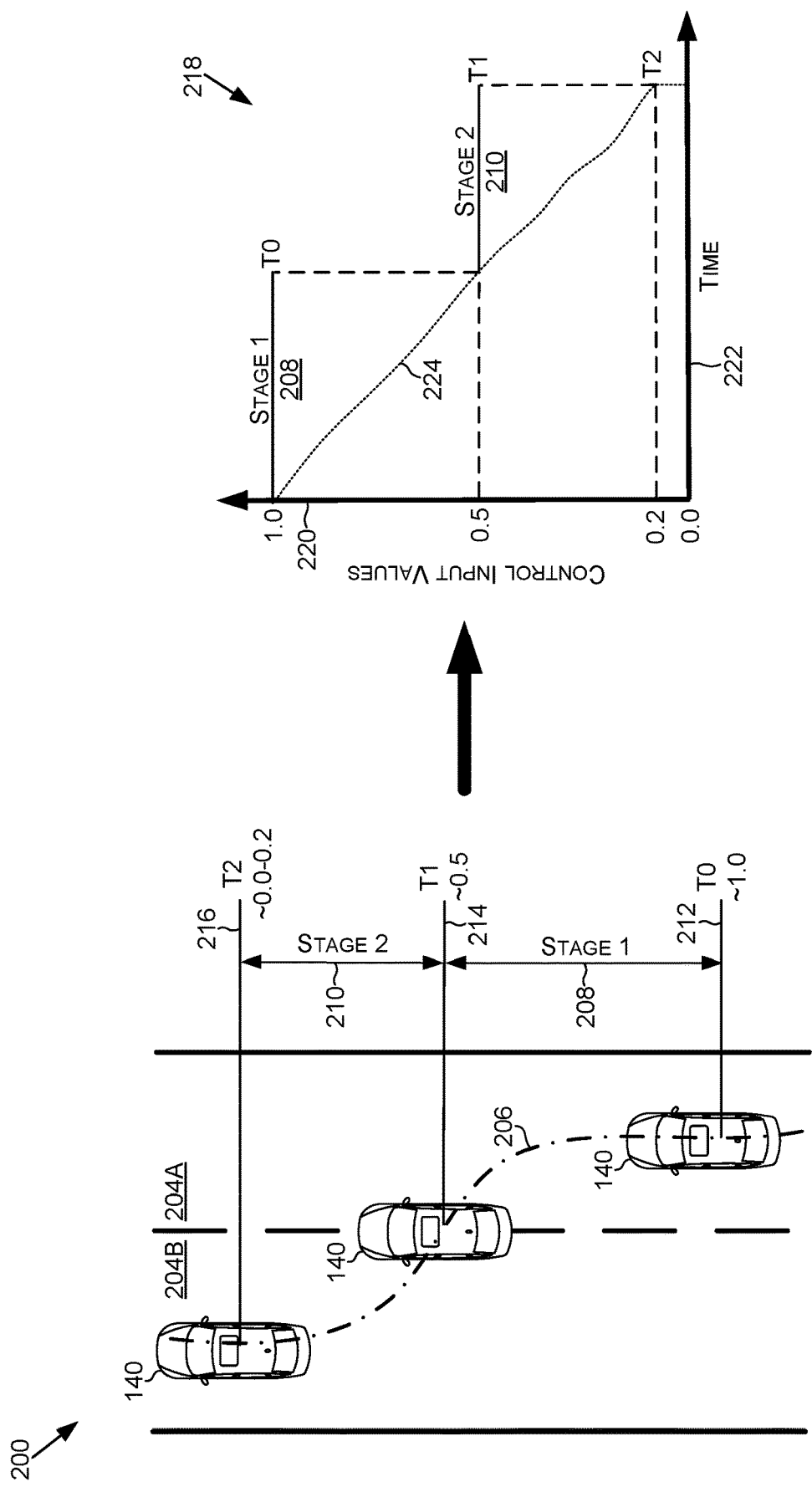
FIG. 2 is an illustration of an example vehicle maneuver and a corresponding chart of control input values for a machine learning model(s) over time for the vehicle maneuver, in accordance with some embodiments of the present disclosure.

FIG. 2 is an illustration of an example vehicle maneuver 200 and a corresponding chart 218 of control input values for a machine learning model(s) over time for the vehicle maneuver, in accordance with some embodiments of the present disclosure. In FIG. 2, the vehicle 140 is making a left lane change from a first lane 204A to a second lane 204B to the left of the first lane 204A. An example trajectory of the vehicle 140 through the lane change is indicated by the trajectory line 206. With respect to the setting, updating, and/or changing the value for the left control operand 106 in response to progress thresholds and/or stages of the left lane change, the control logic 136 of FIG. 1B may be used.

In this example, the vehicle 140 performs the left lane change in two stages, a first stage 208 and a second stage 210 (in other examples, any number of stages may be used). The first stage 208 may be from the beginning of the lane change (e.g., when the trigger signal is received) until the middle of the lane change (e.g., approximately when the centerline of the vehicle lines up with the lane markings separating the original lane from the destination lane, or when the vehicle is roughly equidistant to the outer lane markings of the original lane and the destination lane). The beginning of the lane change may have a first progress threshold 212, T0, indicating that approximately 0% of the lane change has been completed. At the first progress threshold 212, T0, the value of the left control operand 106 may be approximately 1.0, 100%, or another value indicating that the lane change is beginning, as indicated by the chart 218. The middle of the lane change may have a second progress threshold 214, T1, indicating that approximately 50% of the lane change has been completed. At the second progress threshold 214, T1, the value of the left control operand 106 may be approximately 0.5, 50%, or another value indicating that the middle of the lane change has been reached, as indicated by the chart 218. As such, the value for the left control operand 106 may remain relatively constant throughout the first stage 208 (e.g., at 1.0), and may not change (e.g., to 0.5) until the second progress threshold 214, T1, is reached.

Similarly, the second stage 210 may be from the middle of the lane change until the end of the lane change, or a third progress threshold 216, T2, indicating the end of the lane change was reached (e.g., approximately when between 80% to 100% of the lane change has been completed). At the third progress threshold 216, T2, the value of the left control operand 106 may be approximately 0.0, 0%, or another value indicating that the lane change is ending or ended, as indicated by the chart 218. As such, the second stage 210 of the left lane change may span between the second progress threshold 214, T1, and the third progress threshold 216, T2. As such, the value for the left control operand 106 may remain relatively constant throughout the second stage 210 (e.g., at 0.5), and may not change (e.g., to 0.0) until the third progress threshold 216, T2, is reached.

The chart 218 is indicative of the values for the left control operand 106 throughout the left lane change. As described above, the value of the left control operand 106 may be 1.0 throughout the first stage 208, 0.5 throughout the second stage 210, and 0 after (e.g., when the lane change is complete, or the third progress threshold 216, T2, has been reached). The chart 218 also includes a lane change progress to left control operand line 224. The lane change progress to left control operand line 224 is a representation of the values of the left control operand 106 if the left control operand 106 were set, updated, and/or changed based on each lane change progress 122 output by the machine learning model(s) 118 (e.g., lane change progress 122 of 73% at a first time, the value of the left control operand 106 may be set to 0.27, then lane change progress 122 of 75% at a second time after the first time, the value of the left control operand may be set to 0.25, then lane change progress 122 of 74% at a third time after the second time, the value of the left control operand may be set to 0.26). As a result, and as indicated by the lane change progress to left control operand line 224, if the left control operand 106 was set, updated, and/or changed based on each lane change progress 122 output by the machine learning model(s) 118, the result may be noisy.

As such, by implementing stages into lane changes (or other vehicle maneuvers), these noisy outputs from the machine learning model(s) 118 may be avoided and, additionally, the vehicle 140 may be more capable of determining which portion (or stage) of the lane change to drive according to. For example, because a lane change includes basically two turns (e.g., for the left lane change of FIG. 2, a first turn to the left from the first lane 204A to the second lane 204B, and then a second turn to the right to re-align/re-orient with the second lane 204B), by creating two stages, the vehicle 140 is able to determine whether it is currently making the first turn from the first lane 204A to the second lane 204B or the second turn from the middle of the lane change to line up with the second lane 204B (e.g., to enter into a lane keeping mode). In addition, by creating a second progress threshold 214, T1, at a middle of the lane change, noisy outputs (e.g., 48% progress through the turn) after the second progress threshold 214, T1, has been met (e.g., 50% or greater progress through the turn has been met) can be discarded, or ignored, and the vehicle 140 may continue on a smoother trajectory rather than an erratic or sporadic trajectory caused by noisy outputs (e.g., as indicated by the lane change progress to left control operand line 224 of the chart 218).

In some examples, the vehicle 140 may be in a lane keeping mode prior to beginning the lane change (e.g., the vehicle may be in a mode that controls the vehicle 140 to stay in the first lane 204A, where the lane keeping mode may include its own machine learning model(s) and control parameters). During the lane change, the vehicle 140 may be in a lane change mode and, once the third progress threshold 216, T2, is reached, the vehicle 140 may reenter the lane keeping mode (e.g., the vehicle may reenter the lane keeping mode, but now for staying in the second lane 204B). In some examples, entering the lane changing mode may end prior to fully completing the lane change (e.g., where the third progress threshold 216, T2, is less than at 100% progress, such as at 75%, 80%, 85%, etc.). In such examples, the lane keeping mode may be responsible for finishing the lane change by lining the vehicle 140 up with the second lane 204B and maintaining a lane keeping trajectory.

Although FIG. 2 is described with respect to a left lane change, this is not intended to be limiting. For example, the processes described with respect to FIG. 2 may be implemented for right lane changes, turns, lane splits, and/or any other vehicle maneuvers.

Figure 3:
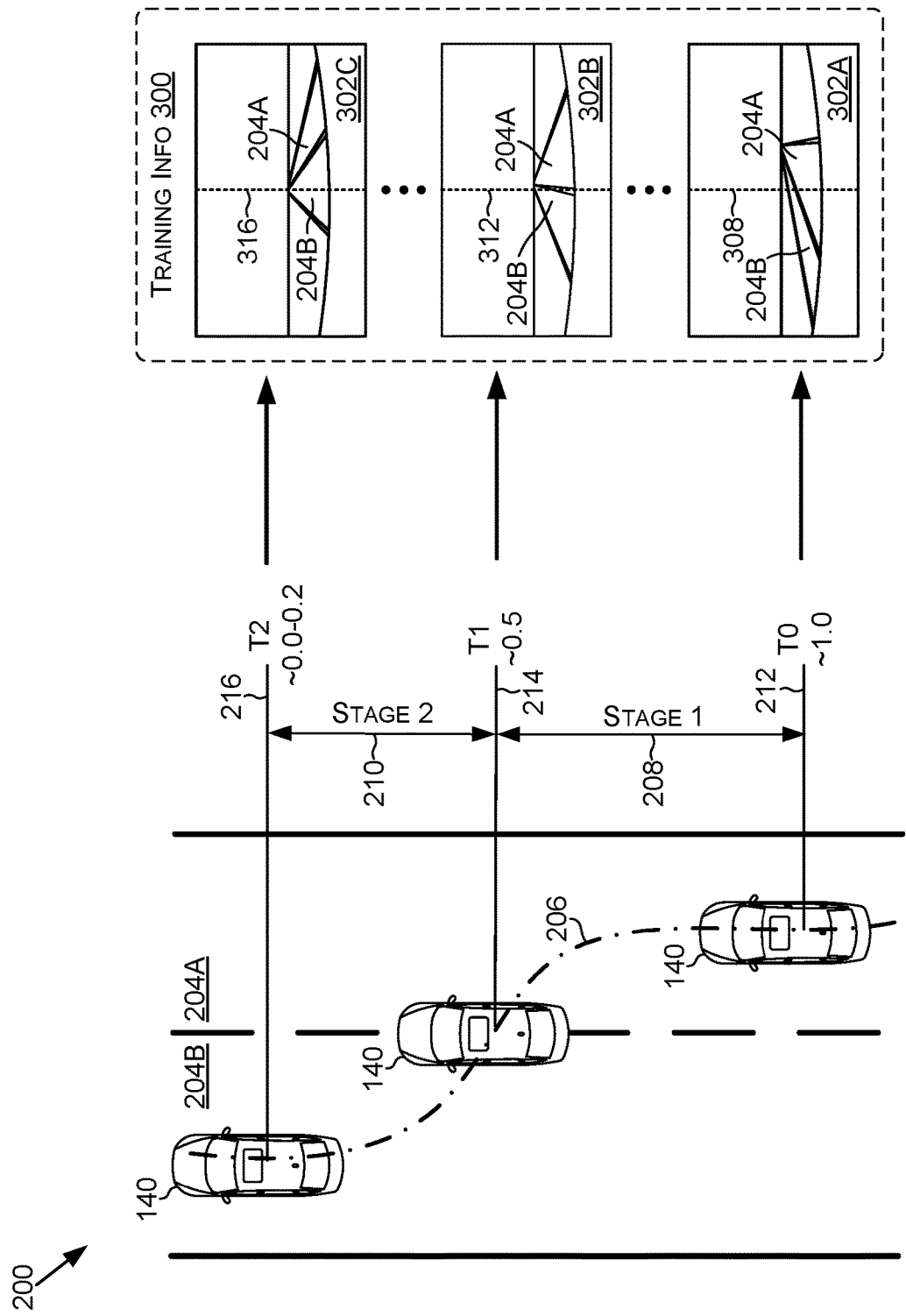
FIG. 3 is an illustration of an example vehicle maneuver and example training data for a machine learning model(s), in accordance with some embodiments of the present disclosure.

Now referring to FIG. 3, FIG. 3 is an illustration of an example vehicle maneuver 200 and example training data for a machine learning model(s) 118, in accordance with some embodiments of the present disclosure. FIG. 3 may include at least one example of training information 300 that may be used to train the machine learning model(s) 118 (e.g., the convolutional network 118A). The training information 300 may include sensor information (e.g., similar to the sensor information 110 of FIGS. 1A-1B), such as image data from camera(s), or other sensor data from LIDAR sensor(s), RADAR sensor(s), and/or the like. In the example of FIG. 3, the training information 300 may include image data from a camera(s) of the vehicle 140 (or another vehicle used for training the machine learning model(s) 118).

To train the machine learning model(s) 118, images 302 (as represented by image data) generated from a camera(s) of the vehicle 140 during lane changes may be used. The images 302 may be tagged at various points along the lane changes, such as at the beginning, the middle, and the end of the lane change. Different images 302 may be tagged for left lane changes and right lane changes.

As illustrated in FIG. 3, the images 302 may be tagged at the beginning of the lane change to correspond with the first progress threshold 212, T0, the middle of the lane change to correspond with the second progress threshold 214, T1, and the end of the lane change to correspond with the third progress threshold 216, T2. In addition, the images 302 may be tagged with the corresponding left control operand 106 and/or right control operand 108 value (e.g., image 302A, from the beginning of the lane change, may be tagged with a left control operand 106 value of 1.0).

As a result, the machine learning model(s) 118 may learn to more clearly identify the stages (e.g., the first stage 208 and the second stage 210) of the lane change and the progress thresholds. By tagging the images 302 at the three stages, the machine learning model(s) 118 may also extrapolate values of the left control operand 106 and/or the right control operand 108 over the entire lane change (e.g., for each of the images between the image 302A and the image 302B, and between the image 302B and the image 302C). In other words, by tagging the images 302 corresponding to the beginning of the lane change (e.g., image 302A), the middle of the lane change (e.g., image 302B), and the end of the lane change (e.g., image 302C) with corresponding values for the left control operand 106 and/or the right control operand 108, the machine learning model(s) 118 may learn values for the left control operand 106 and/or the right control operand 108 and tag the remainder of the images 302 with their corresponding values.

In some examples, extrapolating of the values of the left control operand 106 and/or the right control operand 108 for the remainder of the images 302 of the training information 300 may be performed separately from the machine learning model(s) 118. For example, if the image 302A is tagged with a value of 1.0 for the left control operand 106, and the image 302B is tagged with a value of 0.5 for the left control operand, then each of the images 302 between the image 302A and the image 302B in the sequence of the lane change may be tagged with a value for the left control operand 106 using extrapolation (e.g., if four images 302 are to be tagged, they may be tagged as 0.9, 0.8, 0.7, and 0.6). In some examples, a separate machine learning model(s) may be used to determine the values for the left control operand 106 and/or the right control operand 108 for each of the images 302 between the tagged images 302 (e.g., the images 302A, 302B, and 302C).

As an example, and without limitation, the image 302A may be chosen as the beginning of the lane change, and tagged with a value of the left control operand 106 of 1.0 (e.g., assuming the lane change is the left lane change of the vehicle maneuver 200), based on the vehicle 140 being in a first lane 204A (e.g., a right lane) and beginning to make a turn toward the left (e.g., so that the centerline 308 of the image 302A may be extending through both the first lane 204A and the second lane 204B and through the lane markings dividing the two lanes. In other examples, the beginning of the lane change may be tagged when the centerline 308 is aligned only with the first lane 204A, but immediately before the lane change is to begin.

As another example, and without limitation, the image 302B may be chosen as the middle of the lane change, and tagged with a value of 0.5 for the left control operand 106, based on the vehicle 140 being in between the first lane 204A and the second lane 204B such that the centerline 312 of the image 302B approximately lines up with the lane markings separating the first lane 204A from the second lane 204B, or when the vehicle 140 is roughly equidistant to the outer lane markings of the original lane and the destination lane.

As yet another example, and without limitation, the image 302C may be chosen as the end of the lane change, and tagged with a value of 0.0 for the left control operand 106, based on the vehicle 140 being in the second lane 204B that the centerline 316 of the image 302C approximately lines up with the second lane 204B. In some examples, as described herein, the lane change may be deemed to be completed prior to the vehicle 140 being fully lined up in the destination lane (e.g., the second lane 204B). In such examples, the image 302C may be tagged as the end of the lane change prior to the centerline 316 being lined up within the second lane 204B, such as when the centerline is still angled across the second lane 204B and, in the case of a left lane change, the vehicle 140 has not fully turned back toward the right to line up with the second lane 204B.

Figure 4:
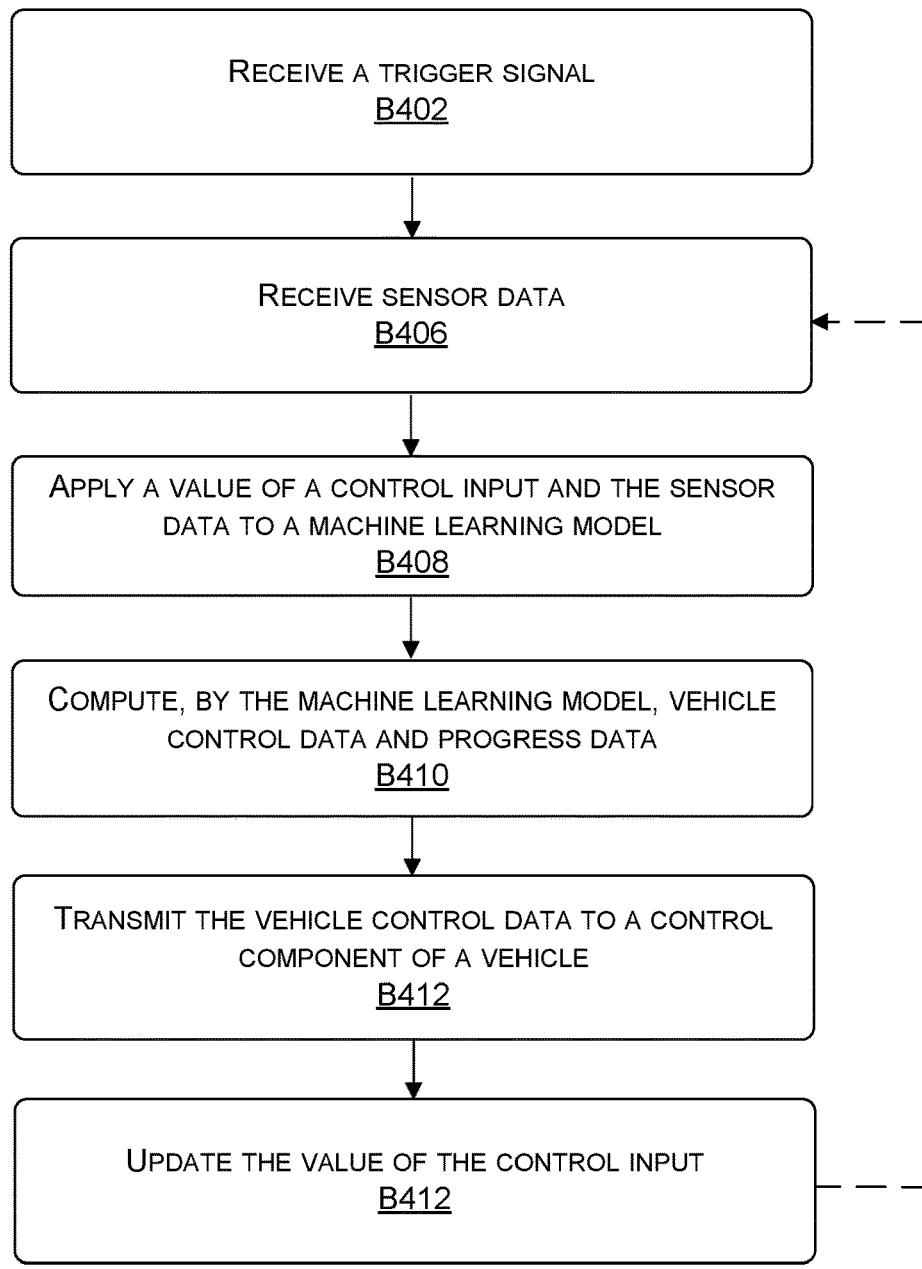
FIG. 4 is a flow diagram showing a method for performing a vehicle maneuver, in accordance with some embodiments of the present disclosure.

Now referring to FIG. 4, FIG. 4 is a flow diagram showing a method 400 for performing a vehicle maneuver, in accordance with some embodiments of the present disclosure. Each block of the method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the vehicle 140 and the process 100. However, the method 400 may additionally or alternatively be executed by any one system, or any combination of systems, including, but not limited to, those described herein.

The method 400, at block B402, includes receiving a trigger signal. For example, in response to an input to the vehicle 140 representative of a command or request to initiate a vehicle maneuver (e.g., a lane change, a turn, etc.) and/or in response to a determination by the vehicle 140 (e.g., by a planning layer of the autonomous driving software stack, such as using a GPS application) to execute a vehicle maneuver, the trigger signal may be generated and received.

The method 400, at block B404, includes receiving sensor data. For example, the sensor information 110 may be generated and/or captured by one or more sensors and/or cameras of the vehicle 140 and received. The sensor information 110 may include sensor data and/or image data representative of a field of view(s) of one or more sensors and/or cameras.

The method 400, at block B406, includes applying a value of a control input and the sensor data to a machine learning model(s). For example, the value of the left control operand 106 and/or the right control operand 108 in addition to the sensor information 110 may be applied to the machine learning model(s) 118.

The method 400, at block B408, includes computing, by the machine learning model(s), vehicle control data and progress data. For example, the machine learning model(s) 118 may compute the vehicle control information 124 and/or the lane change progress 122 based at least in part on the inputs 104 (e.g., the sensor information 110, the value of the left control operand 106 and/or the right control operand 108, the status information 112, and/or other inputs 104).

The method 400, at block B410, includes transmitting the vehicle control data to a control component of the vehicle. For example, the vehicle control information 124 may be transmitted to the control component(s) 128 of the vehicle 140. As described herein, the vehicle control information 124 may include a recommended vehicle trajectory and/or controls for controlling the vehicle 140 according to the recommended vehicle trajectory (e.g., steering angle, acceleration, etc.).

The method 400, at block B412, includes updating the value of the control input. For example, based at least in part on the outputs 120 of the machine learning model(s) 118, the value of the left control operand 106 and/or the right control operand 108 may be updated.

The method may continue by repeating block B406 to block B412 until the vehicle maneuver has completed. Once the vehicle maneuver is determined to have completed, the vehicle 140 may enter another driving mode, such as a lane keeping mode.

Turns and Lane Splits

As described above, conventional systems rely on HD maps for performing maneuvers such as turns and/or lane splits at intersections. However, by relying on an HD map, an autonomous vehicle must first have accurate location information (e.g., from a GPS sensor) and an accurate HD map, and perform localization processing to merge the information for referencing. As a result, when an HD map does not exist and/or when the location information is updating slowly or is inaccurate, making turns or taking lane splits may not be performed effectively or at all (e.g., the autonomous vehicle may implement a safety protocol to abort the maneuver). Otherwise, the autonomous vehicle may perform the maneuver erratically or dangerously (e.g., because the location information is inaccurate, so the localization of the vehicle with respect to the intersection and the turn and/or lane split may suffer as a result), or require hand-off of the controls to a human driver. None of these options are particularly desirable for a passenger of the autonomous vehicle.

The present systems provide for an autonomous vehicle 140 that may make lane changes without relying an HD map and/or location information. Instead, the autonomous vehicle relies on computer vision using sensor data generated from one or more sensors of the vehicle (e.g., cameras, LIDAR sensors, RADAR sensors, etc.). As a result, turns and lane splits are principally perception based, and thus an over-reliance on potentially unavailable and/or inaccurate information (e.g., HD maps, location information, etc.) is avoided.

With reference to turns at intersections or lane splits, a trigger signal (e.g., turn right, turn left, take lane split to right, etc.) may be received in response to an input (e.g., a user input to a turn signal or blinker switch) or otherwise in response to a command from the system (e.g., a navigation command from a GPS system), to indicate that a turn or a lane split is to begin. The trigger signal may cause a control input (e.g., a left control operand for turning left, a right control operand for turning right, a keep right control operand for following the lane split right, etc.) to be updated (e.g., for right turn, the right control operand may be set to an initial value, such as 1.0).

Sensor data from one or more sensors of the vehicle (e.g., cameras, LIDAR sensors 864, RADAR sensors 860, etc.) may be received and input into a machine learning model(s) (e.g., a convolutional neural network that may include individual convolutional streams for each sensor). In some examples, the machine learning model(s) may output vehicle trajectory points (e.g., (x, y) coordinates) representative of a recommended vehicle trajectory and/or controls for a vehicle control unit (e.g., control component(s) of the vehicle) for following the recommended vehicle trajectory. The recommended vehicle trajectory may continue on the current road or along the current path (e.g., not turn) until a suitable intersection or off-ramp is identified. In other words, a recommended vehicle trajectory for a turn or lane split may include not only locations for the turn or lane split but also a stretch of road (which can be indefinitely long) prior to and/or after the turn or lane split locations.

In some examples, orientation information of the vehicle may be used to determine that the turn or lane split has been completed. For example, if the turn is a 90-degree turn, then a change in orientation of the vehicle of 90 degrees (as measured by any number or combination of suitable sensors such as, and without limitation, IMU sensors) may indicate to the system that the turn is complete. In such examples, the orientation information (e.g., as status information) may be input into the machine learning model(s) and the machine learning model(s) may output the status of the turn. In other examples, the orientation information may be separately calculated (e.g., not using the machine learning model(s), or using another machine learning model(s)).

In addition, the machine learning model(s) may output turn or lane split status information (e.g., the amount of the turn or lane split that has been completed) and this output may be fed back to the left control operand or the right control operand (e.g., dependent on the direction of the turn or lane split). This process may continue until the turn or lane split is completed. Once the turn or lane split is complete, the control input may be reset (e.g., set to 0.0, to indicate that the turn or lane split is complete).

In some examples, map data representing a basic depiction of an intersection (e.g., a screenshot of the intersection from a 2D GPS application) may be input into the machine learning model(s) in addition to the sensor data. The machine learning model(s) may use the map data to generate the recommended vehicle trajectory that includes making a turn once an intersection that corresponds to the map data is identified from the sensor data. As a result, a detailed (e.g., HD) map, as used by conventional systems, is not required to obtain the benefit of map data, thereby reducing the requirements that HD map data needs to be available and accurate when controlling the vehicle through a turn or lane split.

In other examples, data representative of a low-resolution map may be input into the machine learning model(s). This map data may represent a 2D road layout, a path along the road layout for the vehicle to follow (e.g., a GPS guided path based on a current location of the vehicle and an end location), and/or a location of the vehicle with respect to one of the road layout or the path (e.g., with the vehicle at the center, oriented vertically). In such examples, the map data may be captured and/or input to the machine learning model(s) at each iteration. The map data may be used for basic localization for the vehicle 140, such as to identify an estimated relative location of the vehicle 140 with respect to the map.

In addition, in such examples, a control input may not be needed, because a turn or lane split is a part of a continuous path from a starting location to an end location and, therefore, by following the path, the vehicle may not need to be blindly (e.g., without any supporting data) identifying an intersection since the intersection is identified in the map data. However, the output of the machine learning model(s) may still include the vehicle trajectory points or controls for following the vehicle trajectory.

In any example, the sensor data, the basic map data, and/or the more detailed map data may be applied to a convolutional neural network. Sensor data from each sensor may be applied to a respective convolutional stream, and the map data may be applied to yet another convolutional stream. The outputs of the convolutional streams may be combined at a layer of the convolutional neural network, such as at the fully connected layer.

Now referring to FIG. 5A, FIG. 5A is a data flow diagram illustrating an example process 500 for performing a vehicle maneuver, in accordance with some embodiments of the present disclosure. The vehicle maneuver described with respect to FIG. 5A is a turn or lane split, however, as described herein, this is for example purposes only and is not intended to be limiting.

The vehicle maneuver may begin when a trigger signal from, in non-limiting examples, a signal generator 502 is received. Any number of inputs 504, including but not limited to those illustrated in FIG. 5A, may be input into a machine learning model(s) 516. The machine learning model(s) 516 may generate or compute any number of outputs 518, including but not limited to those illustrated in FIG. 5A. At least one of the outputs 518 may be fed back into the inputs 504, as indicated by the feedback loop 522 (e.g., the outputs 518 may be used to update one or more of the inputs 504 for a next iteration of the machine learning model(s) 516. At least one of the outputs 518 may be transmitted or sent to a control component(s) 128 of the autonomous vehicle 140. The control component(s) 128 may then use the output(s) 518 (or information generated from the output(s) 518) to control the vehicle 140 according to the output(s) 518.

The trigger signal may include data representative of the type of vehicle maneuver to be completed by the vehicle 140. For example, the trigger signal may include data representing a right turn, a left turn, a left lane split, a right lane split, and/or another vehicle maneuver, such as a lane change, as described in more detail above with respect to FIGS. 1A-1B. In some examples, the trigger signal may be generated using pulse width modulation (PWM), or another signal generation method, and may be analyzed by a component(s) of the vehicle 140 to determine the type of vehicle maneuver represented by the trigger signal.

The trigger signal may be received or generated in response to an input received by the vehicle 140 and/or in response to a decision made by the vehicle 140. For example, an operator of the vehicle 140 may provide an input via a turn signal, a keyboard, a human machine interface (HMI) display, voice input, and/or another input type. The input may be representative of a specific vehicle maneuver and, as a result, the trigger signal representing the specific vehicle maneuver may be generated. As another example, the vehicle 140 (e.g., one or more components or features of a planning layer of an autonomous vehicle software stack) may determine that a specific vehicle maneuver is required or desired and, as a result, may generate the trigger signal representing the specific vehicle maneuver. In such an example, the vehicle 140 may be using an HD map, navigational guidance, and/or another information source to determine that the specific vehicle maneuver is required or desired (e.g., to increase safety). In some examples, the trigger signal may be a guidance signal from a GNSS application (e.g., a GPS application).

The inputs 504 may include a left control operand 506, a right control operand 508, sensor information 510, status information 512, map information 514, and/or other inputs. Values of the left control operand 506 and the right control operand 508 may be determined based on the trigger signal and/or feedback from the outputs 518 of the machine learning model(s) 516. For example, when the trigger signal is representative of a left turn, the value of the left control operand 506 may be set, updated, and/or changed based on the trigger signal. As another example, when the trigger signal is representative of a right turn, the value of the right control operand 508 may be set, updated, and/or changed based on the trigger signal. In any example, the machine learning model(s) 516 may use the left control operand 506 and/or the right control operand 508 in computing the vehicle control information 520 and/or other outputs 518.

In some examples, in response to receiving the trigger signal, the value of the left control operand 506 and/or the right control operand 508 may be set, updated, and/or changed to 1, 100%, and/or another value indicating a start of the turn or lane split. At the end of the turn or lane split, the value of the left control operand 506 and/or the right control operand 508 may be set, updated, and/or changed to 0, 0%, and/or another value indicating that the turn or lane split is complete. In some examples, the value of the left control operand 506 and/or the right control operand 508 may be updated throughout the turn or lane split, similar to the updating of the left control operand 106 and/or the right control operand 108 for a lane change, as described herein. However, because orientation information (e.g., the status information 512) and/or map information 514 may be used, the left control operand 506 and/or the right control operand 508 may only need to be updated to indicate that the turn or lane split should start and that the turn or lane split should end (e.g., so that the vehicle 140 can reenter another mode, such as a lane keeping mode).

Another input 504 that may be applied to the machine learning model(s) 516 is sensor information 510. The sensor information 510 may include sensor data from any of the sensors of the vehicle 140 (and/or other vehicles, in some examples). For example, with reference to FIGS. 8A-8C, the sensor information 110 may include the sensor data generated by, for example and without limitation, global navigation satellite systems (GNSS) sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 140), vibration sensor(s) 842, steering sensor(s) 840, brake sensor(s) (e.g., as part of the brake sensor system 846), and/or other sensor types.

In some examples, the sensor information 510 may include the sensor data generated by forward-facing and/or side-facing cameras, such as a wide-view camera(s) 870, a surround camera(s) 874, a stereo camera(s) 868, and/or a long-range or mid-range camera(s) 898. This sensor data may be useful for computer vision and/or perception when navigating a turn because a forward-facing and/or side-facing camera may include a field of view (e.g., the field of view of the forward-facing stereo camera 868, the forward-facing long range camera(s) 898, and/or the wide-view camera 870 of FIG. 8B) that includes both a current road of travel of the vehicle 140 and at least a portion of the intersection or road that the vehicle 140 is to turn into to complete the vehicle maneuver. In some examples, more than one camera or other sensor may be used to incorporate multiple fields of view (e.g., the field of view of the long-range cameras 898, the forward-facing stereo camera 868, and/or the forward facing wide-view camera 870 of FIG. 8B).

For example, a first camera may be used that has a field of view extending along the centerline of the vehicle 140 (e.g., the forward-facing stereo camera 868), a second camera with a field of view extending along a line that is approximately 45 degrees offset to the left of the field of view of first camera (e.g., the left-forward-facing long-range camera 898), and a third camera with a field of view extending along a line that is approximately 45 degrees offset to the right of the field of view of the first camera (e.g., the right-forward-facing long-range camera 898). The first camera and the third camera may be mounted on or integrated in the wing mirrors, or may be mounted on or integrated in the body of the vehicle 140 along the windshield, for example. The second camera may be mounted or integrated above the windshield on the body of the vehicle 140, may be mounted on the rear-side of the rear-view mirror internal to the vehicle 140, and/or may be mounted on or integrated in the bumper or another region of the front body of the vehicle 140.

As another example, a single camera that includes a larger field of view (e.g., a field of view that includes at least portions of the fields of view of the first camera, the second camera, and the third camera) may be used, such as the wide view camera 870. In any example, a camera(s) that includes a field(s) of view that encompasses at least 120 degrees to 180 degrees in front of the vehicle 140 may be useful for navigating turns and/or lane splits using the machine learning model(s) 516.

In any example, the sensor information 510 may include image data representing image(s), image data representing video (e.g., snapshots of video), and/or sensor data representing fields of view of sensors (e.g., LIDAR sensor(s) 864, RADAR sensor(s) 860, etc.). The sensor information 510 may be input into the machine learning model(s) 516 and used by the machine learning model(s) 516 to compute the outputs 518, such as the vehicle control information 520.

The inputs 504 may include status information 512. The status information 512 may include data representative of the status of the vehicle 140, such as speed, velocity, acceleration, deceleration, orientation, and/or other status information. This data may be captured by and/or received from one or more of the sensors of the vehicle 140, such as one or more of the IMU sensor(s) 866, speed sensor(s) 844, steering sensor(s) 840, vibration sensor(s) 842, and/or one or more sensors of the brake sensor system 846, propulsion system 850, and/or steering system 854.

The status information 512 may be used by the machine learning model(s) 516 to compute the outputs 518, such as the vehicle control information 520. For example, when the vehicle control information 520 includes a recommended vehicle trajectory, or control data for controlling the vehicle 140 according to a recommended vehicle trajectory, the status information 512 (e.g., speed, orientation, etc.) may be valuable to the machine learning model(s) 516 in performing such computations. In other words, a vehicle trajectory that is representative of recommended future (x, y) coordinates of the vehicle 140 may benefit from knowledge of the current speed, orientation, and/or other status information 512 of the vehicle 140. Further, in order to determine that a turn or lane split has been completed, the status information 512 (e.g., orientation information) may be useful (e.g., if a turn is 90 degrees, then determining that the orientation of the vehicle 140 has changed by approximately 90 degrees may indicate that the turn is complete).

Further, in some examples, the inputs 504 may include map information 514. The map information 514 may be used by the machine learning model(s) 516 to generate the outputs 518, such as the vehicle control information 520. For example, the map information 514 may include low-resolution map data (e.g., screenshots of a 2D map application with or without guidance). In other words, in contrast with map data representing an HD map (e.g., the HD map 822 and/or the HD maps described herein and used by conventional systems), the map information 514 may require significantly less storage space, and used only as an additional data point by the machine learning model(s) 516 when computing the outputs 518. The map information 514 may include a screenshot or an image (or data representative thereof) that depicts an intersection (or at least a lane split or turn), such as illustrated by map information 514A of FIG. 5B. In such an example, the map information 514 may include a single image or screenshot, or data representative thereof, of an intersection, and may be provided to the machine learning model(s) 516 once a navigational waypoint has been reached (e.g., once an indication has been received from a GPS application that the turn or lane split is within a certain distance).

Figure 5C:
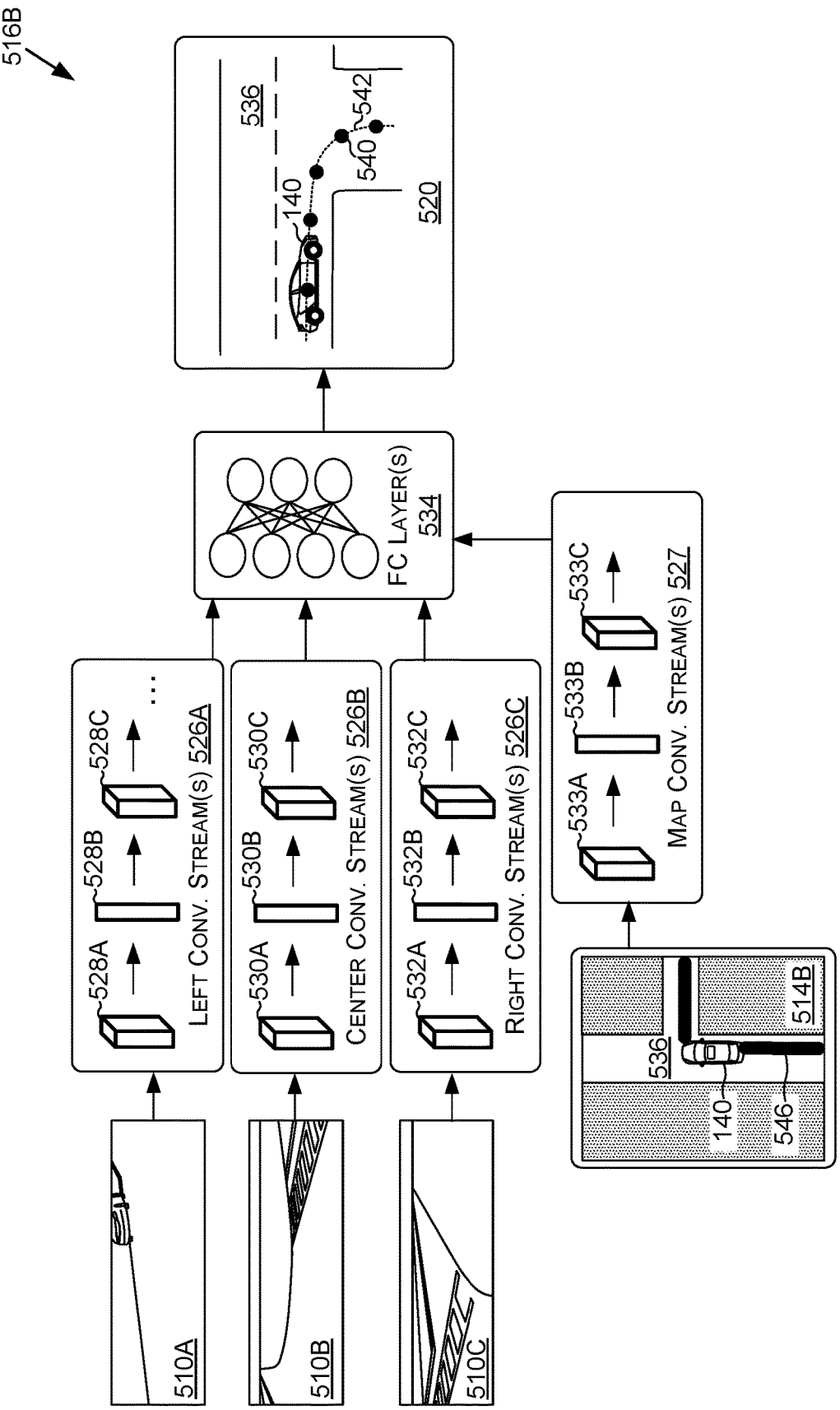
FIG. 5C is an illustration of another example machine learning model(s), in accordance with some embodiments of the present disclosure.

In other examples, the map information 514 may include other map data, such as a path along the road(s) and/or intersection(s) that indicates guidance (e.g. GPS guidance) for the vehicle through the road(s) and/or intersection(s), as illustrated by map information 514B of FIG. 5C. In such examples, the map information 514 may include multiple images or screenshots, or data representative thereof, of the road, the vehicle 140, and/or a path. For example, at each iteration of the machine learning model(s) 516, new map information 514 may be generated to be used by the machine learning model(s) 516 in addition to at least the sensor information 512 to determine the vehicle control information 520.

Figure 8A:
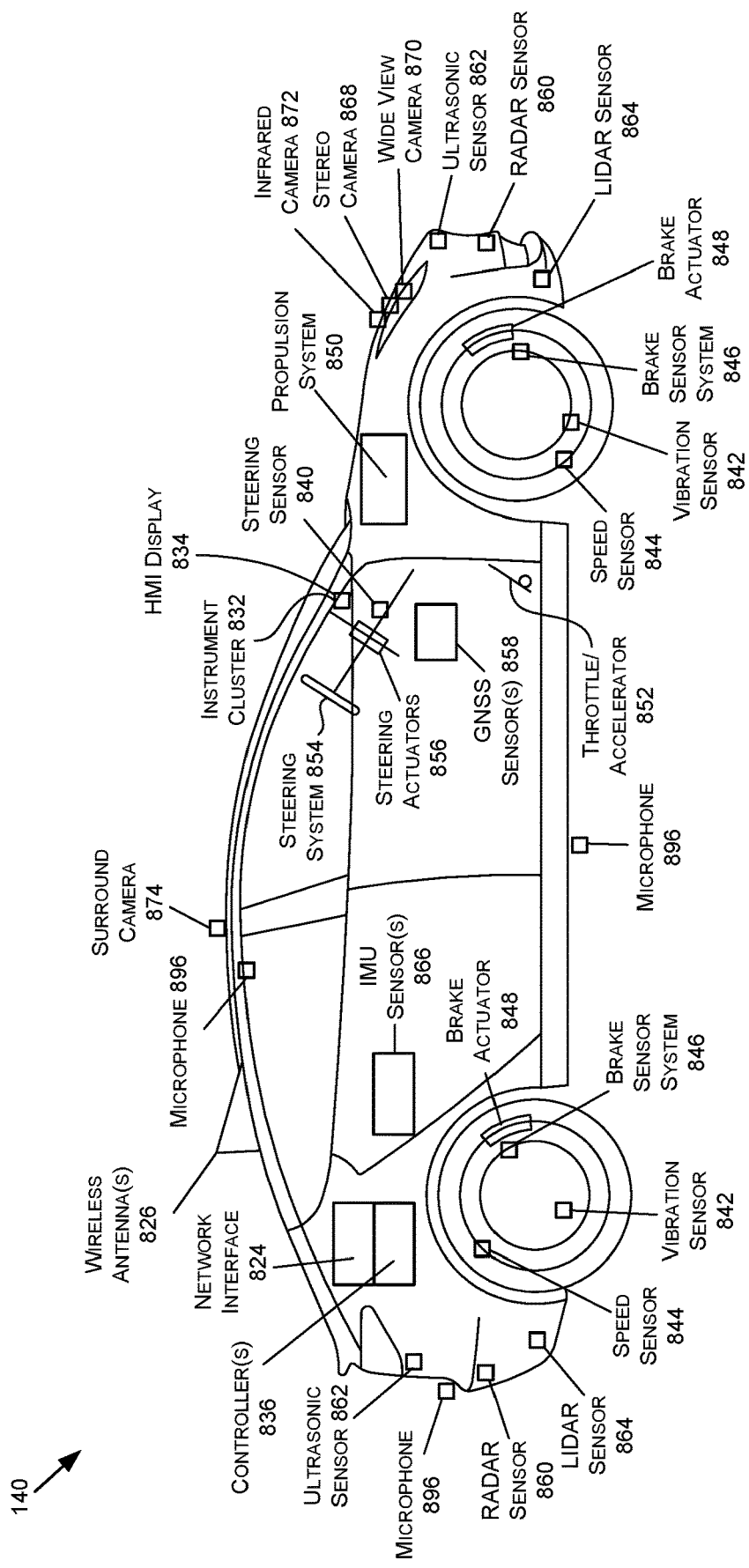
FIG. 8A is an illustration of an example autonomous vehicle, in accordance with some embodiments of the present disclosure.
Figure 8B:
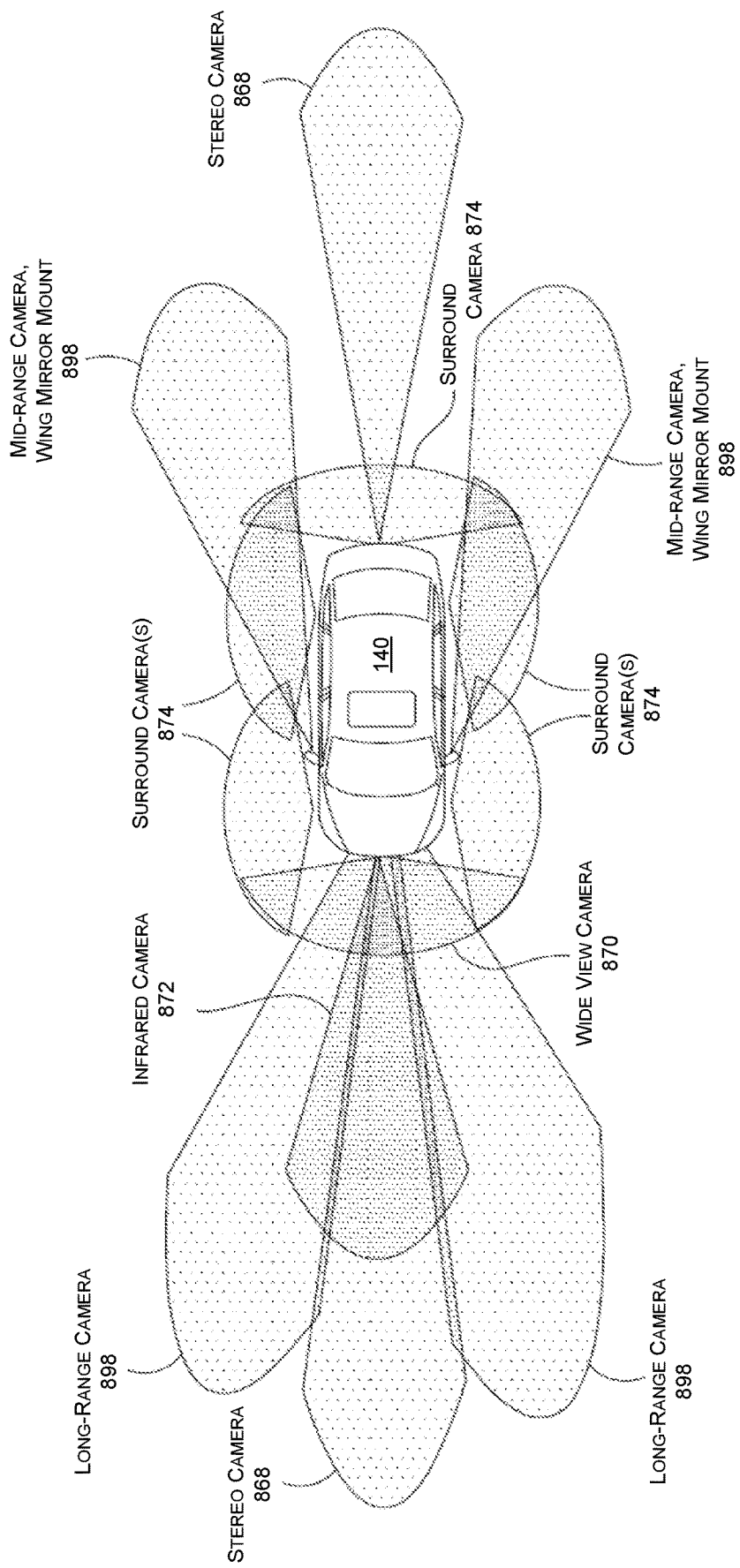
FIG. 8B is an example of camera locations and fields of view for the example autonomous vehicle of FIG. 8A, in accordance with some embodiments of the present disclosure.
Figure 8C:
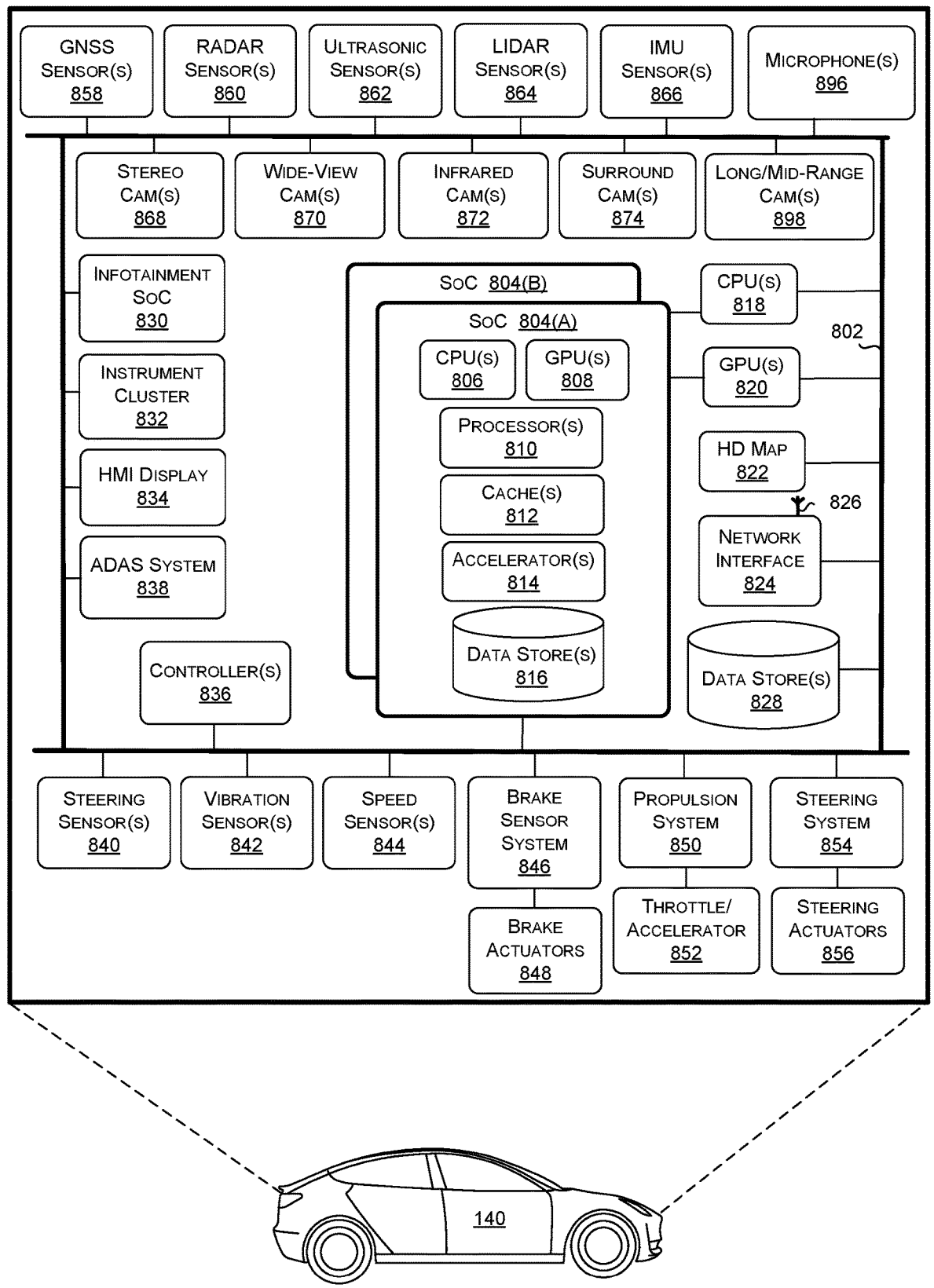
FIG. 8C is a block diagram of an example system architecture for the example autonomous vehicle of FIG. 8A, in accordance with some embodiments of the present disclosure.
Figure 8D:
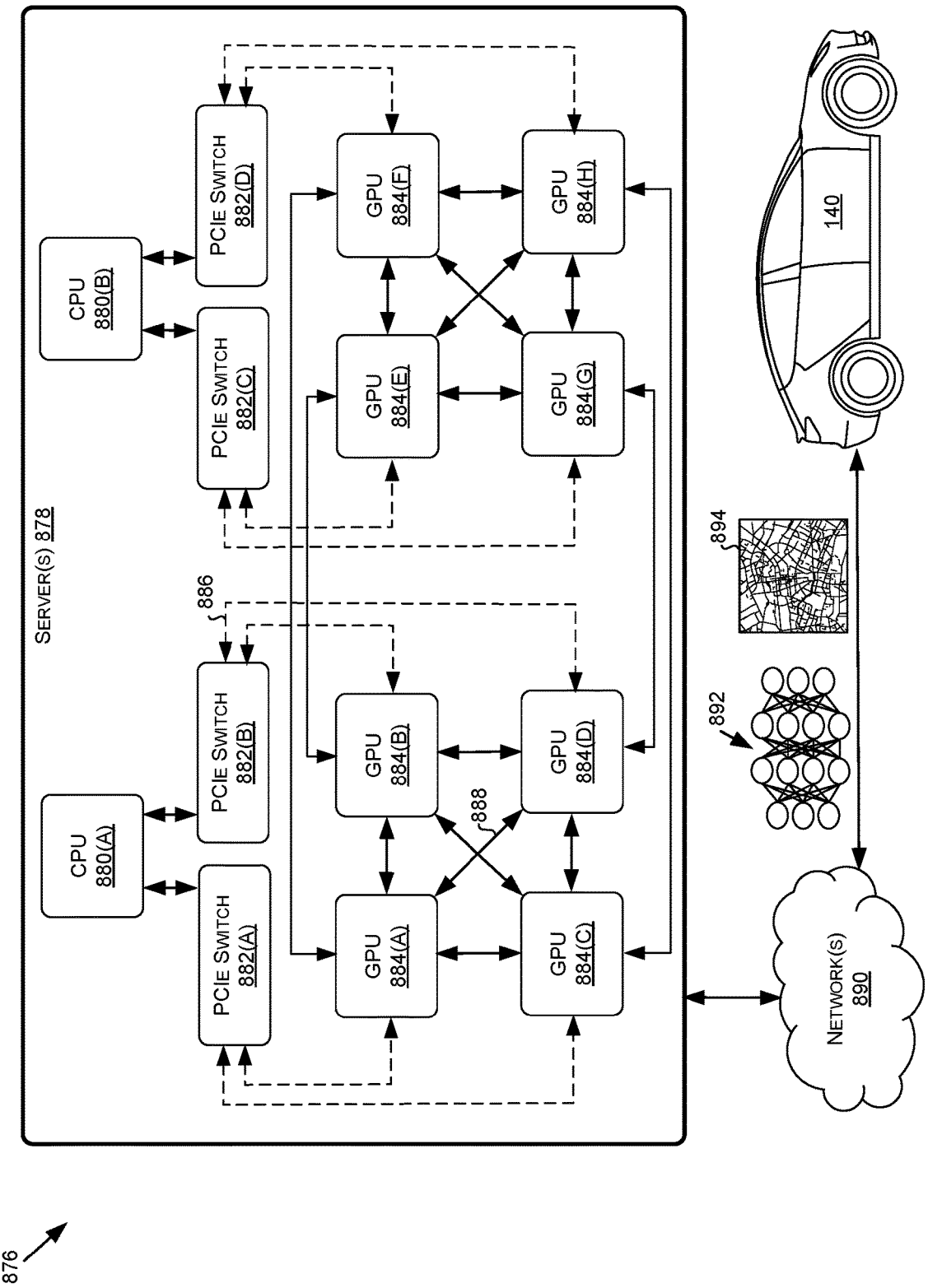
FIG. 8D is a system diagram for communication between cloud-based server(s) and the example autonomous vehicle of FIG. 8A, in accordance with some embodiments of the present disclosure.

In any example, the map information 514 may be generated by the vehicle 140, such as by a GNSS application of the vehicle (e.g., GPS) or another application of the vehicle (e.g., as part of the planning layer of an autonomous driving software stack), may be generated by and received from a server (e.g., the server(s) 878 of FIG. 8D), may be generated by and received from a client device (e.g., a mobile phone, a computer, etc.), and/or may be received and/or generated by another method.

In examples where the map information 514 is one of the inputs 504, and the map information 514 includes the path (e.g., a GPS guidance path) for navigating through the vehicle maneuver, the left control operand 506 and/or the right control operand 508 may be used differently or not at all. For example, the left control operand 506 and/or the right control operand 508 may only include a start value (e.g., 1, 100%, etc.) for the start of the turn or lane split and an end value (e.g., 0, 0%, etc.) for the end of the turn or lane split. In other examples, the left control operand 506 and/or the right control operand 508 may not be needed. In either example, the left control operand 506 and/or the right control operand 508 may be different because the vehicle's location with respect to the path may indicate the progress of the vehicle 140 through the turn or lane split, so the machine learning model(s) 516 may not require the left control operand 506 and/or the right control operand 508 when determining whether the turn or lane split is complete (e.g., the vehicle 140 may rely on the path to make this computation instead).

The machine learning model(s) 516 may use the inputs 504 to compute the outputs 518. Although examples are described herein with respect to using neural networks, and specifically convolutional neural networks, as the machine learning model(s) 516 (e.g., with respect to FIGS. 5B-5C), this is not intended to be limiting. For example, and without limitation, the machine learning model(s) 516 may include any type of machine learning model(s), such as machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

The outputs 518 may include vehicle control information 520, and/or other output types, such as progress through the turn or lane split (or at least an end of a turn or lane split, to update the left control operand 506 and/or the right control operand 508). The vehicle control information 520 may include a recommended vehicle trajectory and/or vehicle control data for controlling the vehicle according to the recommended vehicle trajectory. The outputs 518 may include one or more points (e.g., (x, y) coordinates) along the recommended vehicle trajectory and/or may include the recommended vehicle trajectory (e.g., a trajectory extrapolated over each of the points). In some examples, the recommended vehicle trajectory may be represented as a radius of the vehicle maneuver, while in other examples, the recommended vehicle trajectory may be represented as an inverse radius of the vehicle maneuver. The inverse radius may be used in some examples to prevent the recommended vehicle trajectory (or a point thereof) from being computed as an infinite value (e.g., reaching singularity).

In examples where the vehicle control information 520 includes the recommended vehicle trajectory, the recommended vehicle trajectory (or data representative thereof) may be sent or transmitted to the control component(s) 128 of the vehicle 140 (e.g., to a control layer of the autonomous driving software), and the control component(s) 128 may determine the controls required to control the vehicle 140 according to the recommended vehicle trajectory. For example, the control component(s) 128 may send one or more controls to one or more actuators (e.g., actuators controlled by an actuation layer of the autonomous driving software stack). The actuators may include one or more components or features of the brake sensor system 846, the propulsion system 850, the steering system 854, and/or other systems. The vehicle 140 may then be controlled according to the recommended vehicle trajectory of the vehicle control information 520 output by the machine learning model(s) 516. By only outputting the recommended vehicle trajectory and not the controls themselves, the process 500 may be more likely to be used by different vehicle manufacturers because the different vehicle manufacturers may determine their own controls and actuations for controlling the vehicle 140 according to the recommended vehicle trajectory.

In other examples, the vehicle control information 520 may include the controls for controlling the vehicle 140 according to the recommended vehicle trajectory. In such examples, the machine learning model(s) 516 may be implemented at the control layer of the autonomous driving software stack, and the vehicle control information 520 may be used to control the vehicle 140 (e.g., cause actuation of one or more actuators of the vehicle by the actuation layer of the autonomous driving software stack).

Now referring to FIG. 5B, FIG. 5B is an illustration of an example machine learning model(s) 516A, in accordance with some embodiments of the present disclosure. The machine learning model(s) 516A of FIG. 5B may be one example of a machine learning model(s) 516 that may be used in the process 500. However, the machine learning model(s) 516A of FIG. 5B is not intended to be limiting, and the machine learning model(s) 516 may include additional and/or different machine learning models than the machine learning model(s) 516A of FIG. 5B. The machine learning model(s) 516A may include a convolutional neural network and thus may alternatively be referred to herein as convolutional neural network 516A or convolutional network 516A.

The convolutional network 516A may include inputs 504 that include the left control operand 506, the right control operand 508, the sensor information 510, the map information 514A, and/or other input types. The convolutional network 516A may include sensor information 510A-510C which may include image data generated by one or more cameras (e.g., one or more of the cameras described herein with respect to FIGS. 8A-8C). For example, the sensor information 510A may include image data generated by a first camera (e.g., a left-forward-facing camera), the sensor information 510B may include image data generated by a second camera (e.g., a center-forward-facing camera), and the sensor information 510C may include image data generated by a third camera (e.g., a right-forward-racing camera), such as the first, second, and third cameras described above. More specifically, the sensor information 510A-510C may include individual images generated by the camera(s), where image data representative of one or more of the individual images is input into the convolutional network 516A at each iteration of the convolutional network 516A.

The sensor information 510 may be input into convolutional stream(s) 526 of the convolutional network 516A. For example, the sensor information 510 from each sensor (e.g., camera, LIDAR sensor, RADAR sensor, etc.) may be input into its own convolutional stream 526 (e.g., the sensor information 510A may be input into the convolutional stream 526A, the sensor information 510B may be input into the convolutional stream 526B, and so on). The convolutional stream(s) 526 and/or the convolutional network 516A may include any number of layers 528, 530, and/or 532, parameters, and/or hyper-parameters. The layers 528, 530, and/or 532, parameters, and/or hyper-parameters may be similar to those described above with respect to the convolutional stream 130 and/or the convolutional network 118A of FIG. 1B (e.g., convolutional layers, pooling layers, ReLU layers, etc.).

To train the machine learning model(s) 516, the sensor information 510 may be tagged. For example, the sensor information 510 indicative of a beginning of a turn or lane split may be tagged with a value for the left control operand 506 and/or the right control operand 508 indicating that the turn or lane split has begun (e.g., 1.0, 100%, etc.). The sensor information 510 indicative of an end of the turn or lane split may be tagged with a value for the left control operand 506 and/or the right control operand 508 indicating that the turn or lane split has ended (e.g., 0.0, 0%, etc.). Similar to the training information 300 described above with respect to FIG. 3, the remainder of the sensor information between the start tag and the end tag may be tagged based on extrapolation (which may be computed using rules, logic, the machine learning model(s) 516, and/or another machine learning model(s)).

In some examples, the tagging of the start of the turn or lane split may be prior to the actual turn or lane split (e.g., an instance of the sensor information 510, such as an image, that is 100 feet, 200 feet, 10 frames, 20 frames, etc. before the actual turn or lane split starts may be tagged as the start of the turn or lane split). Similarly, the tagging of the end of the turn or lane split may be after the actual turn or lane split has finished (e.g., an instance of the sensor information, such as an image, that is 100 feet, 150 feet, 25 frames, 30 frames, etc. after the actual turn or lane split ends may be tagged as the end of the turn or lane split). In such examples, the turn or lane split may include a first portion prior to the turn or lane split, a second portion during the turn or lane split, and/or a third portion after the turn or lane split. By doing this, the machine learning model(s) 516 may learn to identify the turn or lane split (e.g., the intersection) as part of the turn or lane split.

In some examples, the map information 514A may be input into convolutional stream(s) 527 of the convolutional network 516A. The map information 514A and/or the convolutional stream(s) 527 may be omitted from certain embodiments (as indicated by the dashed lines). In examples where they are not omitted, the map information 514A may be a 2D, low-resolution representation of an intersection 536 where the turn or lane change is performed. The convolutional stream(s) 527 may also include any number of layers 533, parameters, and/or hyper-parameters. The layers 533, parameters, and/or hyper-parameters may be similar to those described above with respect to the convolutional stream 130 and/or the convolutional network 118A of FIG. 1B (e.g., convolutional layers, pooling layers, ReLU layers, etc.).

The output of the convolutional stream(s) 526 (and the convolutional stream(s) 527, in some examples) may be input to a fully connected layer(s) 534 of the convolutional network 516A. In addition to the output of the convolutional stream(s) 526 (and 527), the left control operand 506, the right control operand 508, and/or one or more other inputs 504 may be input to the fully connected layer(s) 534.

The outputs 518 of the convolutional network 516A may include the vehicle control information 520, and/or other output types, such as progress of the turn or lane split that may be fed back to the left control operand 506 and/or the right control operand 508, as described herein. The vehicle control information 520, as described herein, may include a recommended vehicle trajectory 542 and/or controls for following the recommended vehicle trajectory 542 (e.g., for controlling the vehicle 140 according to the recommended vehicle trajectory 542, such as steering angle, acceleration, deceleration, etc.). The vehicle control information 520 may include, in some examples, a trajectory point(s) 540 (e.g., as represented by (x, y) coordinates) along the recommended vehicle trajectory 542. In some examples, only a single trajectory point 540 (e.g., the next trajectory point for the vehicle 140 to be controlled to) may be output by the machine learning model(s) 516A. In other examples, more than one trajectory point 540 may be output. As another example, an entire trajectory may be output, which may be extrapolated from two or more trajectory points 540. In any example, the recommended vehicle trajectory 542 may be output as a radius of the recommended vehicle trajectory 542, or may be output as an inverse radius of the recommended vehicle trajectory 542, as described herein. The recommended vehicle trajectory 542 and/or the trajectory point(s) 540 thereon, may be used by the control component(s) 128 to control the vehicle 140 through the intersection 536 (e.g., to make a right turn as indicated in FIG. 5B).

With reference to the turn progress, the turn progress may be output as data representative of the turn progress, and the data may be analyzed to determine the turn progress (and/or the lane split progress). In other words, the output of the machine learning model(s) 516 may not be the value of the turn progress, but may instead be a value that correlates to the turn progress. For example, a lookup table may be used to determine the turn progress based on the output of the machine learning model(s) 516.

In some examples, the status information 512 (e.g., the orientation of the vehicle 140) may be used to determine the turn progress. In such examples, the expected change in orientation of the vehicle 140 through the turn or lane split may be known (e.g., from GPS data or from another source, such as a source from the planning layer of the autonomous driving software stack). As such, the expected change in orientation as compared to the actual change in orientation may be indicative of the turn progress. The control logic 544 may determine when the turn is finished, and may update the value of the left control operand 506 and/or the right control operand 508 in response, as indicated by feedback loop 522. In some examples, the left control operand 506 may include positive values (e.g., 0-1, 0%-100%, etc.), and the right control operand 508 may include negative values (e.g., −1-0, −100%-0%, etc.), or vice versa. In such examples, the left control operand 506 and the right control operand 508 may be a single control (e.g., a universal control), and may range from −1 to 1, or −100% to 100%, and/or the like.

In other examples, the machine learning model(s) 516 may not be used to determine the turn progress. For example, similar to described above, the expected change in orientation may be known, and sensor data from one or more IMU sensor(s) 866, for example, may be used to determine when the turn or lane split is finished. This computation may be performed based on rules, logic, and/or may be performed by another machine learning model(s) trained to determine orientation changes. In such examples, the left control operand 506 and/or the right control operand 508 may be updated based on this separate computation and may not be a feedback loop from the machine learning model(s) 516A.

Now referring to FIG. 5C, FIG. 5C is an illustration of another example machine learning model(s) 516B, in accordance with some embodiments of the present disclosure. The machine learning model(s) 516B of FIG. 5C may be one example of a machine learning model(s) 516 that may be used in the process500. However, the machine learning model(s) 516B of FIG. 5C is not intended to be limiting, and the machine learning model(s) 516 may include additional and/or different machine learning models than the machine learning model(s) 516B of FIG. 5C. The machine learning model(s) 516B may include a convolutional neural network and thus may alternatively be referred to herein as convolutional neural network 516B or convolutional network 516B.

The convolutional network 516B may be similar to that of the convolutional network 516A, described above (e.g., may include at least some similar inputs 504 and/or outputs 518). However, instead of the map data 514A, the convolutional network 516B may include the map information 514B which, as described herein, may include the path 546 for the vehicle 140 when performing the vehicle maneuver and/or may be applied to the convolutional network 516B more frequently (e.g., at each iteration) than the map data 514A of the convolutional network 516A. As such, the convolutional network 516B may not need the left control operand 506, the right control operand 508, and/or the feedback loop 522 for updating the left control operand 506 and/or the right control operand 508, because the path 546 may provide an indication that the turn or lane shift is complete.

For example, the path 546 may include a continuous path from a starting point to a destination, and along the way there may be turns, lane splits, lane changes, etc. In such an example, the convolutional network 516B may use the map information 514B, as applied to the convolutional stream(s) 527, to determine when the turn, lane split, lane change, and/or other vehicle maneuver begins and ends. However, the path 546 is not intended to include exact coordinates for the vehicle 140 to follow, and thus the vehicle 140 may still rely on the convolutional network 516B to provide the recommended vehicle trajectory 542 and/or the control for controlling the vehicle 140 according to the recommended vehicle trajectory 542. In other words, the path 546 serves as a low-definition, high-level guide for the vehicle 140, and the outputs 518 of the convolutional network 516B are used for determining the actual trajectory of the vehicle when navigating turns, lane splits, and/or lane changes.

Figure 6:
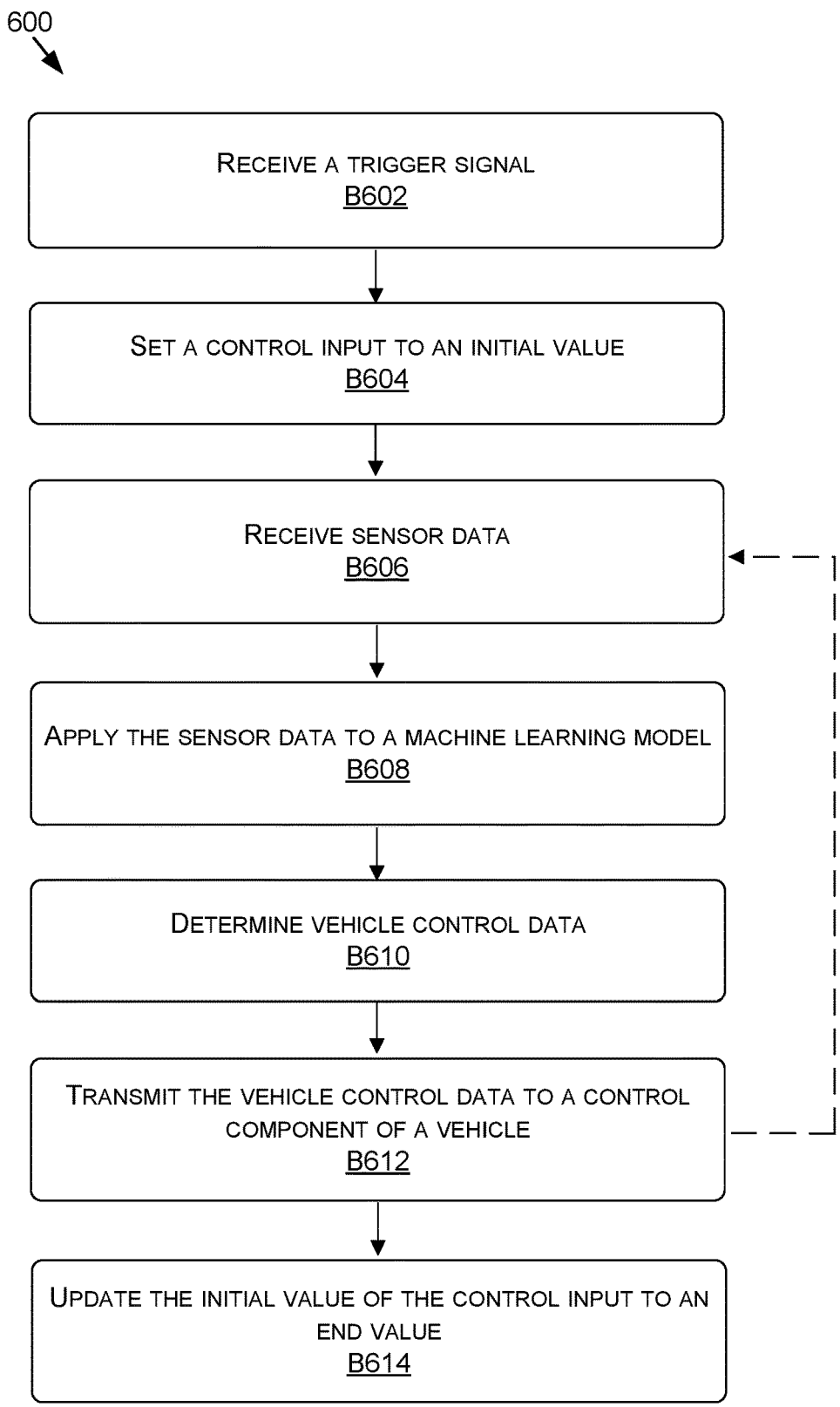
FIG. 6 is a flow diagram showing a method for performing another vehicle maneuver, in accordance with some embodiments of the present disclosure.

Now referring to FIG. 6, FIG. 6 is a flow diagram showing a method 600 for performing another vehicle maneuver, in accordance with some embodiments of the present disclosure. Each block of the method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the vehicle 140, the process 500, and the machine learning model(s) 516A. However, the method 600 may additionally or alternatively be executed by any one system, or any combination of systems, including, but not limited to, those described herein.

The method 600, at block B602, includes receiving a trigger signal. For example, in response to an input to the vehicle 140 representative of a command or request to initiate a vehicle maneuver (e.g., a turn, a lane split, etc.) and/or in response to a determination by the vehicle 140 (e.g., by a planning layer of the autonomous driving software stack, such as using a GPS application) to execute a vehicle maneuver, the trigger signal may be generated and/or received.

The method 600, at block B604, includes setting a control input to an initial value. For example, in response to or based on receiving the trigger signal, the left control operand 506 and/or the right control operand 508 may be set to an initial value (e.g., 1, 100%, or another value indicating that the vehicle maneuver is to be initiated or to begin).

The method 600, at block B606, includes receiving sensor data. For example, the sensor information 510 may be generated and/or captured by one or more sensors and/or cameras of the vehicle 140 and received. The sensor information 510 may include sensor data and/or image data representative of a field of view(s) of one or more sensors and/or cameras.

In some examples, the method 600 may further include receiving map information 514, such as the map information 514A.

The method 600, at block B608, includes applying the sensor data to a machine learning model(s). For example, the sensor information 510 may be applied to the machine learning model(s) 516 (e.g., the convolutional neural network 516A). In addition to the sensor data, the value of the left control operand 106 and/or the right control operand 108 may be applied to the machine learning model(s) 516. In some examples, as described herein, the map information 514 (e.g., the map information 514A) may be applied to the machine learning model(s) 516.

The method 600, at block B610, includes determining vehicle control data. For example, the machine learning model(s) 516 may compute and/or determine the vehicle control information 520 based on the inputs 504 (e.g., the sensor information 510, the map information 514, the status information 512, the left control operand 506, the right control operand 508, and/or other inputs 504).

The method 600, at block B612, includes transmitting the vehicle control data to a control component of a vehicle. For example, the vehicle control information 520 may be transmitted to the control component(s) 128 of the vehicle 140. The method 600, at block B612, may be similar to that of block B412 of the method 400, described above.

The method 600 may include blocks B606 to B612 repeating until the vehicle maneuver is completed. Once the vehicle maneuver is completed, the method 600, at block B614, includes updating the initial value of the control input to an end value. For example, the value of the left control operand 506 and/or the right control operand 508 may be set, updated, and/or changed to indicate to the machine learning model(s) 516 that the vehicle maneuver is complete (as indicated by the feedback loop 522 of FIG. 5B). The vehicle maneuver may be determined to be complete based on orientation information of the vehicle 140, as determined by the machine learning model(s) 516, rules, logic, and/or another machine learning model(s). Once the vehicle maneuver is complete, the vehicle 140 may enter another mode, such as a lane keeping mode, as described herein.

Figure 7:
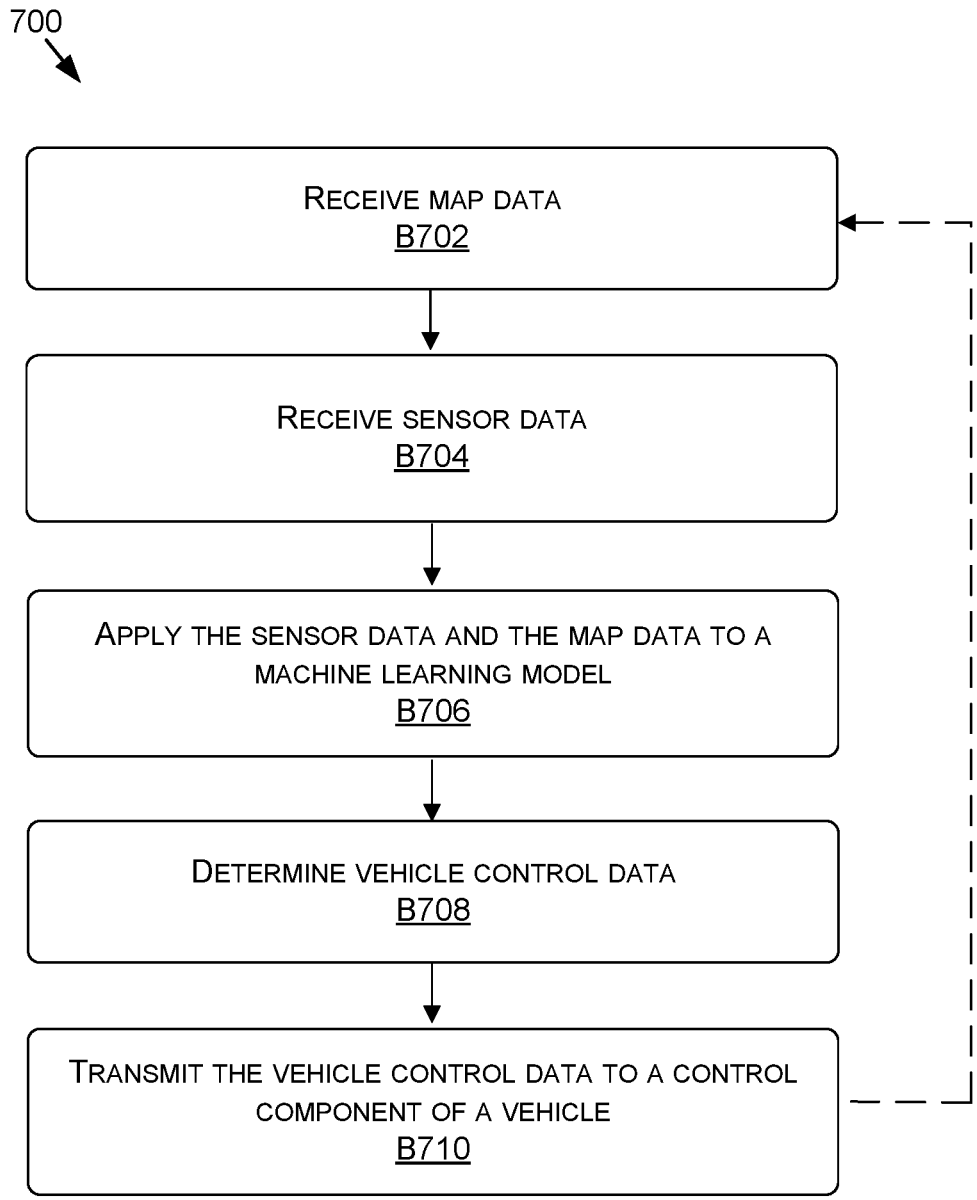
FIG. 7 is a flow diagram showing a method for performing another vehicle maneuver, in accordance with some embodiments of the present disclosure.

FIG. 7 is a flow diagram showing a method 700 for performing another vehicle maneuver, in accordance with some embodiments of the present disclosure. Each block of the method 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 700 is described, by way of example, with respect to the vehicle 140, the process 500, and the machine learning model(s) 516B. However, the method 700 may additionally or alternatively be executed by any one system, or any combination of systems, including, but not limited to, those described herein.

The method 700, at block B702, includes receiving map data. For example, the map information 514B may be received. The map information 514B may include the path 546, and the path may include a turn, a lane split, a lane change, and/or another vehicle maneuver. The map data 514B may be generated by and received from a GPS application or another module of a planning layer of the autonomous driving software stack, for example.

The method 700, at block B704, includes receiving sensor data. For example, the sensor information 510 may be generated and/or captured by one or more sensors and/or cameras of the vehicle 140 and received. The sensor information 510 may include sensor data and/or image data representative of a field of view(s) of one or more sensors and/or cameras.

The method 700, at block B706, includes applying the sensor data and the map data to a machine learning model(s). For example, the sensor information 510 and the map information 514 (e.g., the map data 514B) may be applied to the machine learning model(s) 516 (e.g., the convolutional neural network 516B).

The method 700, at block B708, includes determining vehicle control data. For example, the machine learning model(s) 516 may compute and/or determine the vehicle control information 520 based on the inputs 504 (e.g., the sensor information 510, the map information 514, the status information 512, and/or other inputs 504).

The method 700, at block B710, includes transmitting the vehicle control data to a control component of a vehicle. For example, the vehicle control information 520 may be transmitted to the control component(s) 128 of the vehicle 140. The method 600, at block B612, may be similar to that of block B412 of the method 400, described above.

The method 700 may include blocks B702 to B710 repeating until the vehicle maneuver is completed. Once the vehicle maneuver is complete, the vehicle 140 may enter another mode, such as a lane keeping mode, as described herein.

Example Autonomous Vehicle

FIG. 8A is an illustration of an example autonomous vehicle 140, in accordance with some embodiments of the present disclosure. The vehicle 140 may include a passenger vehicle, such as a car, a truck, a bus, and/or another type of vehicle that may or may not accommodate one or more passengers. Autonomous vehicles may be generally described in terms of automation levels, such as those defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 140 may be capable of functionality in accordance with one or more of Level 3-Level 5 of the autonomous driving levels. For example, the vehicle 140 may be capable of conditional automation (Level 3), high automation (Level 4), and/or full automation (Level 5), depending on the embodiment.

The vehicle 140 may include components such as a chassis, a vehicle body, wheels (e.g., 2, 4, 6, 8, 18, etc.), tires, axles, and other components. The vehicle 140 may include a propulsion system 850, such as an internal combustion engine, hybrid electric power plant, an all-electric engine, and/or another propulsion system type. The propulsion system 850 may be connected to a drive train of the vehicle 140, which may include a transmission, to enable the propulsion of the vehicle 140. The propulsion system 850 may be controlled in response to receiving signals from a throttle/accelerator 852.

A steering system 854, which may include a steering wheel, may be used to steer the vehicle 140 (e.g., along a desired path, route, or trajectory) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system (s) on chips (SoCs) 804 (FIG. 8C) and/or GPU(s), may provide signals (e.g., representative of commands) to one or more components and/or systems of the vehicle 140. For example, the controller(s) may send signals to operate the vehicle brakes via one or more brake actuators 848, to operate the steering system 854 via one or more steering actuators 856, and/or to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/ or to assist a human driver in driving the vehicle 140. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 140 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 140), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 140 and provide outputs (e.g., represented by output data, display data, etc.) via a human-machine interface (HMI) display 834, an audible annunciator, a loudspeaker, and/or via other components of the vehicle 140. The outputs may include information such as vehicle velocity, speed, time, map data (e.g., the HD map 822 of FIG. 8C), location data (e.g., the vehicle's 140 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 140 further includes a network interface 824 which may use one or more wireless antenna(s) 826 and/or modem(s) to communicate over one or more networks. For example, the network interface 824 may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The wireless antenna(s) 826 may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc.

FIG. 8B is an example of camera locations and fields of view for the example autonomous vehicle 140 of FIG. 8A, in accordance with some embodiments of the present disclosure. The cameras and respective fields of view are one example embodiment and are not intended to be limiting. For example, additional and/or alternative cameras may be included, few cameras may be used, and/or the cameras may be located at different locations on the vehicle 140.

The camera types for the cameras may include, but are not limited to, digital cameras that may be adapted for use with the components and/or systems of the vehicle 140. The camera(s) may operate at automotive safety integrity level (ASIL) B and/or at another ASIL. The camera types may be capable of any image capture rate, such as 60 frames per second (fps), 820 fps, 240 fps, etc., depending on the embodiment. The cameras may be capable of using rolling shutters, global shutters, another type of shutter, or a combination thereof. In some examples, a color filter array of the cameras may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform Advanced Driver Assistance Systems (ADAS) functions (e.g., as part of a redundant or fail-safe design). For example, a Multi-Function Mono Camera may be installed to provide functions including lane departure warning, traffic sign assist and intelligent headlamp control. Also, one or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 140 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a Complementary Metal Oxide Semiconductor (CMOS) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number of wide-view cameras 870 on the vehicle 140. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic, such as a Field-Programmable Gate Array (FPGA), and a multi-core micro-processor with an integrated Controller Area Network (CAN) or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that includes portions of the environment to the side of the vehicle 140 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 140. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 140 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868, infrared camera(s) 872, etc.), as described herein.

FIG. 8C is a block diagram of an example system architecture for the example autonomous vehicle 140 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 140 in FIG. 8C are illustrated as being connected via bus 802. The bus 802 may include a CAN data interface (alternatively referred to herein as a "CAN bus"), Ethernet, FlexRay, and/or another type of bus. A CAN may be a network inside the vehicle 140 used to aid in control of various features and functionality of the vehicle 140, such as actuation of brakes, acceleration, braking, steering, windshield wipers, etc. A CAN bus may be configured to have dozens or even hundreds of nodes, each with its own unique identifier (e.g., a CAN ID). The CAN bus can be read to find steering wheel angle, ground speed, engine revolutions per minute (RPMs), button positions, and/or other vehicle status indicators. The CAN bus may be ASIL B compliant.

Although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 140, and two or more busses 802 may communicate with the same components. In some examples, each SoC 804, each controller 836, and/or each computer within the vehicle may have access to the same input data (e.g., inputs from sensors of the vehicle 140), and may be connected to a common bus, such the CAN bus.

The vehicle 140 may include one or more controller(s) 836, such as those described herein with respect to FIG. 8A. The controller(s) 836 may be used for a variety of functions. The controller(s) 836 may be coupled to any of the various other components and systems of the vehicle 140, and may be used for control of the vehicle 140, artificial intelligence of the vehicle 140, infotainment for the vehicle 140, and/or the like.

The SoC 804 may include Central Processing Unit(s) (CPU) 806, Graphics Processing Unit(s) (GPU) 808, processor(s) 810, cache(s) 812, accelerator(s) 814, data store(s) 816, and/or other components and features not illustrated. The SoC(s) 804 may be used to control the vehicle 140 in a variety of platforms and systems. For example, the SoC(s) 804 may be combined in a system (e.g., the system of the vehicle 140) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster can be independently clock-gated when all cores are clock-gated or power-gated; and/or each core cluster can be independently power-gated when all cores are power-gated.

The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated using Fin Field-Effect Transistor (FinFET) technologies. However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a Synchronous Graphics Random-Access Memory (SGRAM) may be used, such as a Graphics Double Data Rate type Five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, Address Translation Services (ATS) support may be used to allow the GPU(s) 808 to access the CPU(s) 806 page tables directly. In such examples, when the GPU(s) 808 Memory Management Unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that can keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, Convolutional Neural Networks (CNNs), etc.) that are stable enough to be amenable to acceleration. The term "CNN," as used herein, may include all types of CNNs, including Region-based or Regional Convolutional Neural Networks (RCNNs) and Fast RCNNs (e.g., as used for object detection).

The accelerator(s) 814 (e.g., the hardware acceleration cluster) may include a Deep Learning Accelerator(s) (DLA). The DLA(s) may include one or more Tensor Processing Units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a Programmable Vision Accelerator(s) (PVA), which may alternatively be referred to herein as a computer vision accelerator. The PVA(s) may be designed and configured to accelerate computer vision algorithms for the Advanced Driver Assistance Systems (ADAS), autonomous driving, and/or Augmented Reality (AR) and/or Virtual Reality (VR) applications. The PVA(s) may provide a balance between performance and flexibility. For example, each PVA(s) may include, for example and without limitation, any number of Reduced Instruction Set Computer (RISC) cores, Direct Memory Access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a Real-Time Operating System (RTOS). The RISC cores may be implemented using one or more integrated circuit devices, Application Specific Integrated Circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a Vector Processing Unit (VPU), an instruction cache, and/or Vector Memory (e.g., VMEM). A VPU core may include a digital signal processor such as, for example, a Single Instruction, Multiple Data (SIMD), Very Long Instruction Word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional Error Correcting Code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an Advanced Peripheral Bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 68508 standards, although other standards and protocols may be used.

In some examples, the SoC(s) 804 may include a real-time ray-tracing hardware accelerator, such as described in U.S. patent application Ser. No. 16/101,832, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 814 (e.g., the hardware accelerator cluster) have a wide array of uses for autonomous driving. The PVA may be used for key processing stages in ADAS and autonomous vehicles. The PVA's capabilities may be a good match for algorithmic domains needing predictable processing, at low power and low latency. In other words, the PVA may perform well on semi-dense or dense regular computation, even on small data sets, which need predictable run-times with low latency and low power. Thus, in the context of platforms for autonomous vehicles, the PVAs may be designed to run classic computer vision algorithms, as they are typically efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value may be used by the system to make further decisions regarding which detections should be considered as true positive detections rather than false positive detections. For example, the system can set a threshold value for the confidence and consider only the detections exceeding the threshold value as true positive detections. In an Automatic Emergency Braking (AEB) system, false positive detections would cause the vehicle to automatically perform emergency braking, which is obviously undesirable. Therefore, only the most confident detections should be considered as triggers for AEB. The DLA can run a neural network for regressing the confidence value. The neural network can take as its input at least some subset of parameters, such as bounding box dimensions, ground plane estimate obtained (e.g. from another subsystem), Inertial Measurement Unit (IMU) sensor 866 output that correlates with the vehicle 140 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 140 into a chauffeur to safe stop mode (e.g., bring the vehicle 140 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. The in-cabin monitoring camera sensors may be monitored by a neural network running on another instance of the Advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction may weight spatial information accordingly, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a Mobile Industry Processor Interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 140, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology described herein may provide capabilities and functionality that cannot be achieved by conventional systems. For example, computer vision algorithms can be executed on CPUs, which can be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which may be required for in-vehicle ADAS applications, and for practical Level 3-5 autonomous vehicles.

By providing a CPU complex, GPU complex, and a hardware acceleration cluster, multiple neural networks may be used simultaneously and/or sequentially, and the results may be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as may be required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (e.g., executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 140. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In some examples, the CNN running on the DLA is trained to identify the relative closing speed of the emergency vehicle (e.g., by using the Doppler Effect). The CNN can also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 140 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 140.

The vehicle 140 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 140 information about vehicles in proximity to the vehicle 140 (e.g., vehicles in front of, on the side of, and/or behind the vehicle 140). This functionality may be part of a cooperative adaptive cruise control functionality of the vehicle 140.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 140 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that can store at least one bit of data.

The vehicle 140 may further include GNSS sensor(s) 858. The GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a Universal Serial Bus (USB) connector with an Ethernet to Serial (RS-232) bridge.

The vehicle 140 may further include RADAR sensor(s) 860. The RADAR sensor(s) 860 may be used by the vehicle 140 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250*m* range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 140 surroundings at higher speeds with minimal interference from traffic in adjacent lanes. The other two antennae may expand the field of view, making it possible to quickly detect vehicles entering or leaving the vehicle's 140 lane.

Mid-range RADAR systems may include, as an example, a range of up to 860m (front) or 80*m* (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 140 may further include ultrasonic sensor(s) 862. The ultrasonic sensor(s) 862, which may be positioned at the front, back, and/or the sides of the vehicle 140, may be used for park assist and/or to create and update an occupancy grid. A wide variety of ultrasonic sensor(s) 862 may be used, and different ultrasonic sensor(s) 862 may be used for different ranges of detection (e.g., 2.5*m*, 4*m*). The ultrasonic sensor(s) 862 may operate at functional safety levels of ASIL B.

The vehicle 140 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 140 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 140m, with an accuracy of 2 cm-3 cm, and with support for a 140 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 140. The LIDAR sensor(s) 864, in such examples, may provide up to an 820-degree horizontal and 35-degree vertical field-of-view, with a 200*m* range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 140. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe)

laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may have low susceptibility to motion blur, vibration, and/or shock.

The vehicle may further include IMU sensor(s) 866. The IMU sensor(s) 866 may be located at a center of the rear axle of the vehicle 140, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and altitude. As such, in some examples, the IMU sensor(s) 866 may enable the vehicle 140 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 140. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 140. The types of cameras used depends on the embodiments and requirements for the vehicle 140, and any combination of camera types may be used to provide the desired coverage around the vehicle 140. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 140 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 140 may include an ADAS system 838. The ADAS system 838 may include a SoC, in some examples. The ADAS system 838 may include Autonomous/Adaptive/Automatic Cruise Control (ACC), Cooperative Adaptive Cruise Control (CACC), Forward Crash Warning (FCW), Automatic Emergency Braking (AEB), Lane Departure Warnings (LDW), Lane Keep Assist (LKA), Blind Spot Warning (BSW), Rear Cross-Traffic Warning (RCTW), Collision Warning Systems (CWS), Lane Centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 140 and automatically adjust the vehicle speed to maintain a safe distance from vehicles ahead. Lateral ACC performs distance keeping, and advises the vehicle 140 to change lanes when necessary. Lateral ACC is related to other ADAS applications such as Lane Change Assistance (LCA) and Collision Warning System (CWS).

CACC uses information from other vehicles that may be received via the network interface 824 and/or the wireless antenna(s) 826 from other vehicles via a wireless link, or indirectly, over a network connection (e.g., over the Internet). Direct links may be provided by a Vehicle-to-Vehicle (V2V) communication link, while indirect links may be Infrastructure-to-Vehicle (I2V) communication link. In general, the V2V communication concept may provide information about the immediately preceding vehicles (e.g., vehicles immediately ahead of and in the same lane as the vehicle 140), while the I2V communication concept may provide information about traffic further ahead. CACC systems can include either or both I2V and V2V information sources. Given the information of the vehicles ahead of the vehicle 140, CACC can be more reliable with the potential to improve traffic flow smoothness and reduce congestion on the road.

FCW systems may be designed to alert the driver to a hazard, so that the driver can take corrective action. FCW systems may use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems may detect an impending forward collision with another vehicle or other object, and may automatically apply the brakes, such as if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it may first alert the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems may provide visual, audible, and/or tactile warnings, such as steering wheel or seat vibrations, to alert the driver when the vehicle 140 crosses lane markings. An LDW system may not activate when the driver indicates an intentional lane departure, such as by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems may be a variation of LDW systems. LKA systems may provide steering input or braking to correct the vehicle 140 if the vehicle 140 starts to exit the lane.

BSW systems may detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide a visual, audible, and/or tactile notification when an object is detected outside the rear-camera range when the vehicle 140 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Some ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 140, the vehicle 140 itself may, in the case of conflicting results, decide whether to heed the result from a primary computer or a secondary computer (e.g., a first controller 836 or a second controller 836). For example, in some cases, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory Multipoint Control Unit (MCU). If outputs from the primary computer and the secondary computer conflict, the supervisory MCU may determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In some embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety, and performance. For example, the diverse implementation and intentional non-identity may make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 140 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 140. For example, the infotainment SoC 830 may include radios, disk players, navigation systems, video players, USB and Bluetooth connectivity, carputers, in-car entertainment, WiFi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 140. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 140) fail. In such an example, the infotainment SoC 830 may put the vehicle 140 into a chauffeur to safe stop mode, as described herein.

The vehicle 140 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

FIG. 8D is a system diagram for communication between cloud-based server(s) and the example autonomous vehicle 140 of FIG. 8A, in accordance with some embodiments of the present disclosure. The system 876 may include server(s) 878, network(s) 890, and vehicles, including the vehicle 140. The server(s) 878 may include a plurality of GPUs 884(A)-884 (H) (collectively referred to herein as GPUs 884), PCIe switches 882(A)-882 (H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data (e.g., any combination of the machine learning models described herein). The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 890, and/or the machine learning models may be used by the server(s) 878 to remotely monitor and/or control the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 140. For example, the deep-learning infrastructure may receive periodic updates from the vehicle 140, such as a sequence of images and/or objects that the vehicle 140 has located in that sequence of images (e.g., via computer vision and/or other machine learning object classification techniques). The deep-learning infrastructure may run its own neural network to identify the objects and compare them with the objects identified by the vehicle 140 and, if the results do not match and the infrastructure concludes that the AI in the vehicle 140 is malfunctioning, the server(s) 878 may transmit a signal to the vehicle 140 instructing a fail-safe computer of the vehicle 140 to assume control, notify the passengers, and complete a safe parking maneuver.

For inferencing, the server(s) 878 may include the GPU(s) 884 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

The elements (e.g., systems, components, features, machines, interfaces, functions, orders, groupings of functions, functionality, and/or arrangements) described with respect to embodiments of the present disclosure are set forth only as examples. Other elements other than those described herein may be used in addition to or instead of those described herein, and some elements may be omitted altogether. Further, many of the elements described herein are functional entities that may be implemented as discrete or distributed components or in conjunction with other components, and in any suitable combination and location.

Various functions described herein as being performed by entities may be carried out by hardware, firmware, and/or software. For instance, various functions may be carried out by a processor executing instructions stored in memory.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system on a chip (SoC) comprising:
   one or more central processing unit (CPU) clusters;
   one or more graphics processing units (GPUs);
   a plurality of reduced instruction set computer (RISC) cores;
   one or more deep learning accelerators (DLAs); and
   one or more image signal processors (ISPs),
   wherein the SoC, at least in part, causes performance of one or more operations corresponding to a vehicle based at least on a trajectory determined using one or more deep neural networks and based at least on map data and sensor data, wherein the map data is generated using one or more maps and the sensor data is generated using one or more sensors of the vehicle.

2. The SoC of claim 1, further comprising one or more vector processing units (VPUs).

3. The SoC of claim 2, wherein at least one VPU of the one or more VPUs includes a very long instruction word (VLIW) and single instruction multiple data (SIMD) processor.

4. The SoC of claim 1, further comprising a safety subsystem implemented using one or more dedicated processing units.

5. The SoC of claim 1, further wherein the one or more sensors of the vehicle include one or more cameras, wherein at least a portion of the sensor data is generated using the one or more cameras.

6. The SoC of claim 5, wherein the sensor data is used to generate image data of an environment corresponding to a location of the vehicle.

7. The SoC of claim 6, wherein the image data corresponds to a surround view of the environment.

8. The SoC of claim 1, wherein the sensor data includes at least one of RADAR data generated using one or more RADAR sensors of the vehicle or LiDAR data generated using one or more LiDAR sensors of the vehicle.

9. The SoC of claim 1, wherein at least one operation of the one or more operations corresponds to a control operation for the vehicle.

10. The SoC of claim 1, wherein the SoC implements one or more cache coherency protocols.

11. The SoC of claim 1, wherein the SoC is associated with at least one of:
    a control system for an autonomous or semi-autonomous machine;
    a perception system for an autonomous or semi-autonomous machine;
    a system for performing deep learning operations;
    a system implemented using an edge device; or
    a system implemented at least partly using cloud computing resources.

12. A system comprising:
    one or more central processing unit (CPU) clusters;
    one or more graphics processing units (GPUs);
    a plurality of reduced instruction set computer (RISC) cores;
    one or more deep learning accelerators (DLAs); and
    one or more image signal processors (ISPs),
    wherein the system, at least in part, causes performance of one or more operations corresponding to a vehicle based at least on a trajectory, the trajectory determined, at least in part, using one or more deep neural networks and based at least on map data generated using one or more maps and sensor data generated using one or more sensors of the vehicle.

13. The system of claim 12, further comprising one or more vector processing units (VPUs).

14. The system of claim 13, wherein at least one VPU of the one or more VPUs includes a very long instruction word (VLIW) and single instruction multiple data (SIMD) processor.

15. The system of claim 12, further comprising a safety subsystem including one or more dedicated processing units.

16. The system of claim 12, wherein the sensor data includes image data generated using one or more cameras of a plurality of cameras of the vehicle.

17. The system of claim 16, wherein the image data corresponds to a surround view of an environment.

18. The system of claim 12, wherein the sensor data includes at least one of RADAR data generated using one or more RADAR sensors of the vehicle or LiDAR data generated using one or more LiDAR sensors of the vehicle.

19. The system of claim 11, wherein the system implements one or more cache coherency protocols.

20. A vehicle comprising:
    one or more sensors;
    a system on a chip (SoC) comprising:
        one or more central processing unit (CPU) clusters;
        one or more graphics processing units (GPUs);
        a plurality of reduced instruction set computer (RISC) cores;
        one or more deep learning accelerators (DLAs); and
        one or more image signal processors (ISPs),
        wherein the vehicle performs one or more operations based at least on a trajectory, the trajectory determined, at least in part, using one or more deep neural networks and based at least on processing map data and sensor data.

* * * * *